United States Patent
Yanagihara

[11] Patent Number: 6,115,531
[45] Date of Patent: *Sep. 5, 2000

[54] METHOD AND APPARATUS FOR REPRODUCING/RECORDING AT VARIABLE SPEEDS DEPENDENT UPON THE BIT RATE OF THE MPEG ENCODED SIGNAL

[75] Inventor: Naofumi Yanagihara, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,803

[22] Filed: Jun. 13, 1997

Related U.S. Application Data

[63] Continuation of application No. 08/558,914, Nov. 13, 1995.

[30] Foreign Application Priority Data

Nov. 14, 1994 [JP] Japan ................................ 6-304421
Dec. 12, 1994 [JP] Japan ................................ 6-332092
Jan. 27, 1995 [JP] Japan ................................ 7-031683

[51] Int. Cl.$^7$ .................................................. H04N 5/76
[52] U.S. Cl. .............................. 386/67; 386/68; 386/112
[58] Field of Search ........................... 386/6, 7, 8, 33, 386/68, 109, 112, 104, 85, 67, 88, 13, 17; 360/64, 18, 20, 21, 33.1; 348/845.1, 845, 845.2, 845.3, 555, 705, 554, 706, 558, 465

[56] References Cited

U.S. PATENT DOCUMENTS

| | | | |
|---|---|---|---|
| 4,611,252 | 9/1986 | Igata et al. | 386/74 |
| 4,672,469 | 6/1987 | Namiki et al. | 386/6 |
| 4,862,292 | 8/1989 | Enari et al. | 360/8 |
| 4,905,104 | 2/1990 | Okamoto et al. | 360/70 |
| 5,341,248 | 8/1994 | Amada et al. | 360/33.1 |
| 5,377,051 | 12/1994 | Lane et al. | 386/81 |
| 5,416,600 | 5/1995 | Matsumi et al. | 386/112 |
| 5,446,552 | 8/1995 | Inoue et al. | 386/80 |
| 5,465,180 | 11/1995 | Amada et al. | 386/112 |
| 5,473,385 | 12/1995 | Leske | 348/464 |
| 5,493,456 | 2/1996 | Augenbraun et al. | 360/64 |
| 5,566,174 | 10/1996 | Sato et al. | 370/84 |
| 5,576,907 | 11/1996 | Hasegawa | 386/74 |
| 5,589,993 | 12/1996 | Naimpally | 386/119 |

*Primary Examiner*—Wendy Garber
*Assistant Examiner*—Aung S. Moe
*Attorney, Agent, or Firm*—Frommer Lawrence & Haug, LLP.; William S. Frommer; Glenn F. Savit

[57] ABSTRACT

When a transport packet of the MPEG2 signal is recorded, a tape speed is reduced to ½ or ¼ of that used to record standard data in accordance with the bit rate of the program. Two heads (A and B) having different azimuths are provided in close proximity with each other at the same height on a drum. If the ½ tape speed mode is selected, the recording is performed by head A during the first scan of the tape and by head B during the next scan. Even when the tape speed is a fraction of an even number of the standard tape speed, the azimuth angles of adjacent tracks are different and azimuth recording is performed to reduce crosstalk.

23 Claims, 20 Drawing Sheets

Fig. 1
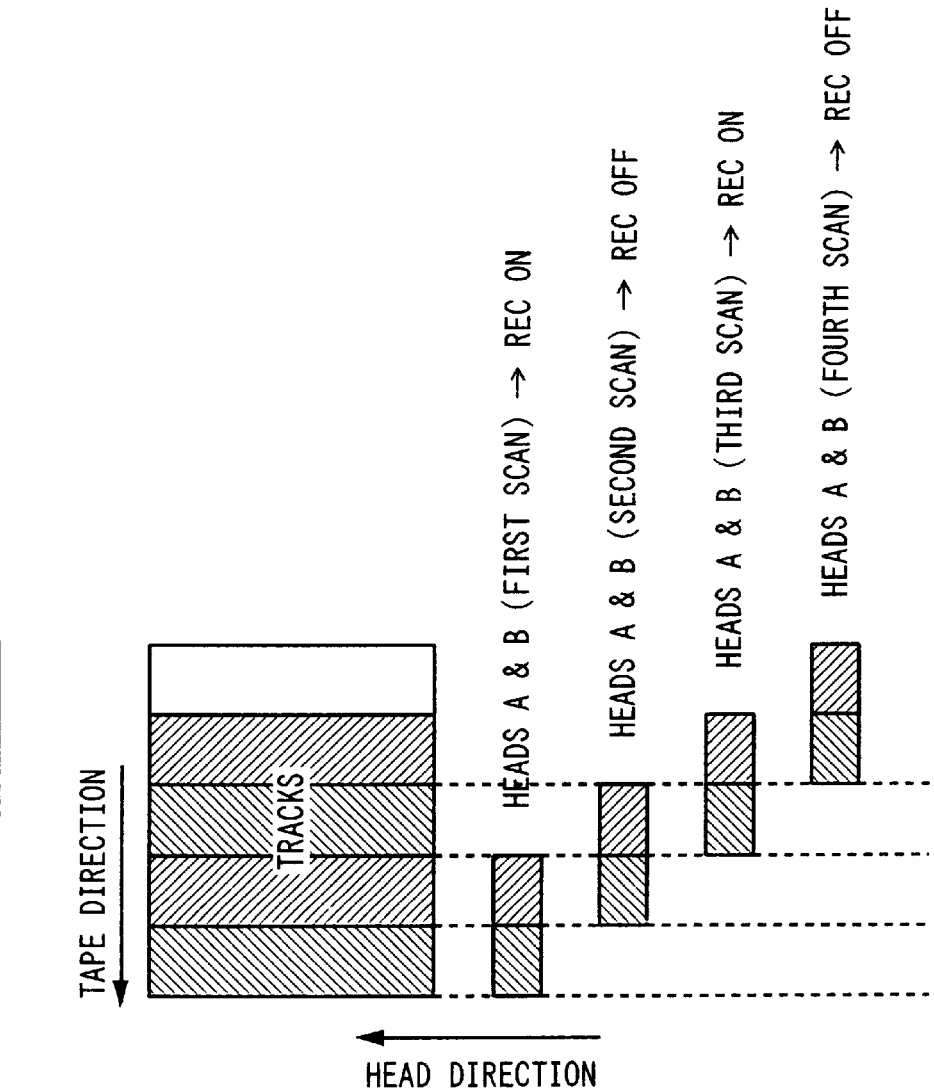
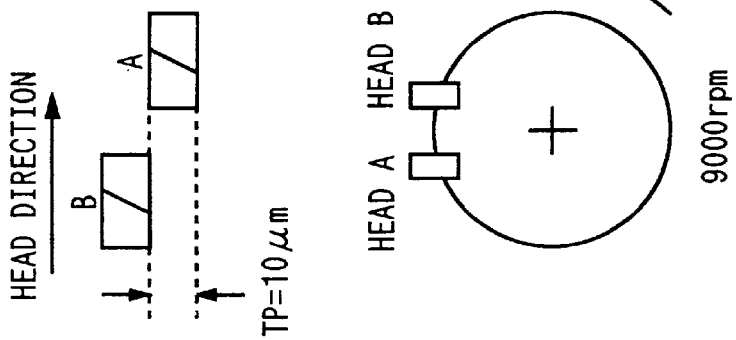

| | | TP1 (18x) | TP2 (4x) |
|---|---|---|---|
| 2*1HEAD/9000rpm | SPEED LOCK | ±1.5x, 2.5x, 3.5x,···,8.5x | NA |
| | PHASE LOCK | +18x/−16x | +4x/−2x |
| 1*2HEAD/9000rpm | SPEED LOCK | ±1.5x, 2.5x, 3.5x,···,8.5x | NA |
| | PHASE LOCK | +18x/−16x | +4x/−2x |
| 2*2HEAD/4500rpm | SPEED LOCK | ±1.5x, 2.5x, 3.5x,···,8.5x | NA |
| | PHASE LOCK | NA | +4x/−2x |

Fig. 16A

| | | T0 | T1 | T2 | T3 |
|---|---|---|---|---|---|
| ECC 3 (RESERVE) | | 9SB | 9SB | 9SB | 9SB |
| NORMAL PLAY AREA | | 101SB | 101SB | 101SB | 126SB |
| TRICK PLAY AREA | TP 1 | 25SB | — | 25SB | — |
| | TP 2 | — | 25SB | — | — |

Fig. 16B

| | SB No. FOR TP | | | | ECC 3 | TRACK |
|---|---|---|---|---|---|---|
| TP 1 (18×) | No. 40-44 | No. 62-66 | No. 84-88 | No. 106-110 | No. 128-132 | No. 147-155 | T0 |
| TP 2 (5×) | | No. 38-62 | | | | No. 147-155 | T1 |
| TP 1 (18×) | No. 40-44 | No. 62-66 | No. 84-88 | No. 106-110 | No. 128-132 | No. 147-155 | T2 |
| TP 2 (5×) | | | — | | | No. 147-155 | T3 |

Fig. 17

TP1 (18x) :     SPEED-LOCK MODE

| TAPE SPEED | SD MODE | 1/2-SD MODE | 1/4-SD MODE |
|---|---|---|---|
| ±1.0x | | | |
| ±1.25x | ±1.25x | ±2.5x | ±5.0x |
| ±1.5x | ±1.5x | ±3.0x | ±6.0x |
| ±1.75x | ±1.75x | ±3.5x | ±7.0x |
| ±2.0x | | | |
| ±2.25x | ±2.25x | ±4.5x | ±9.0x |
| ±2.5x | ±2.5x | ±5.0x | ±10.0x |
| ±2.75x | ±2.75x | ±5.5x | ±11.0x |
| ±3.0x | | | |
| ±3.25x | ±3.25x | ±6.5x | ±13.0x |
| ±3.5x | ±3.5x | ±7.0x | ±14.0x |
| ±3.75x | ±3.75x | ±7.5x | ±15.0x |
| ±4.0x | | | |
| ±4.25x | ±4.25x | ±8.5x | ±17.05x |
| ±4.5x | ±4.5x | ±9.0x | ±18.0x |
| ±4.75x | ±4.75x | ±9.5x | ±19.0x |
| ±5.0x | | | |
| ±5.25x | ±5.25x | ±10.5x | ±21.0x |
| ±5.5x | ±5.5x | ±11.0x | ±22.0x |
| ±5.75x | ±5.75x | ±11.5x | ±23.0x |
| ±6.0x | | | |
| ±6.25x | ±6.25x | ±12.5x | ±25.0x |
| ±6.5x | ±6.5x | ±13.0x | ±26.0x |
| ±6.75x | ±6.75x | ±13.5x | ±27.0x |
| ±7.0x | | | |
| ±7.25x | ±7.25x | ±14.5x | ±29.0x |
| ±7.5x | ±7.5x | ±15.0x | ±30.0x |
| ±7.75x | ±7.75x | ±15.5x | ±31.0x |
| ±8.0x | | | |
| ±8.25x | ±8.25x | ±16.5x | ±33.0x |
| ±8.5x | ±8.5x | ±17.0x | ±34.0x |

Fig. 18

TP1 (18x): PHASE-LOCK MODE

| TAPE SPEED | SD MODE | 1/2-SD MODE | 1/4-SD MODE |
|---|---|---|---|
| -16x | -16x | -32x | -64x |
| +18x | +18x | +36x | +72x |

Fig. 19

TP2 (4x): PHASE-LOCK MODE

| TAPE SPEED | SD MODE | 1/2-SD MODE | 1/4-SD MODE |
|---|---|---|---|
| -1/4x | — | — | — |
| -1/2x | — | — | -2.0x |
| -1.0x | — | -2.0x | -4.0x |
| -2.0x | -2.0x | -4.0x | -8.0x |
| -3.0x | | | |
| -4.0x | | | |

| TAPE SPEED | SD MODE | 1/2-SD MODE | 1/4-SD MODE |
|---|---|---|---|
| +1/4x | — | — | — |
| +1/2x | — | — | +2.0x |
| +1.0x | — | +2.0x | +4.0x |
| +2.0x | +2.0x | +4.0x | +8.0x |
| +3.0x | | | |
| +4.0x | +4.0x | +8.0x | +16.0x |

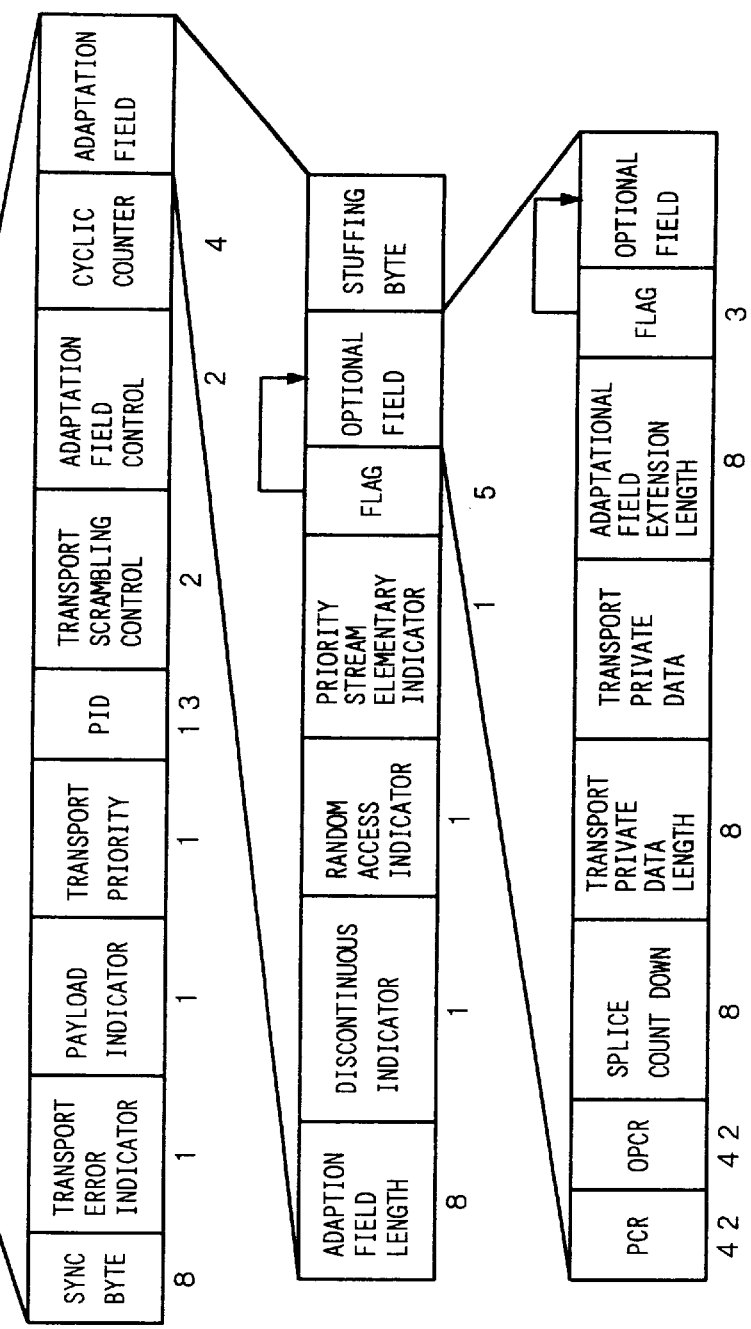

Fig. 25A
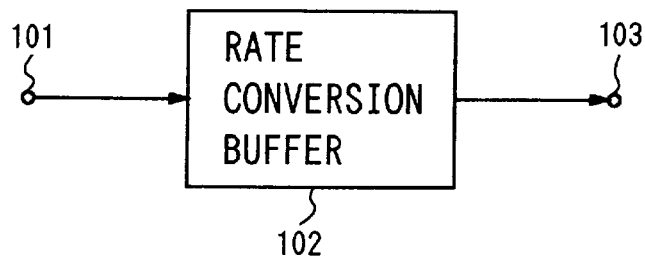
Fig. 25B
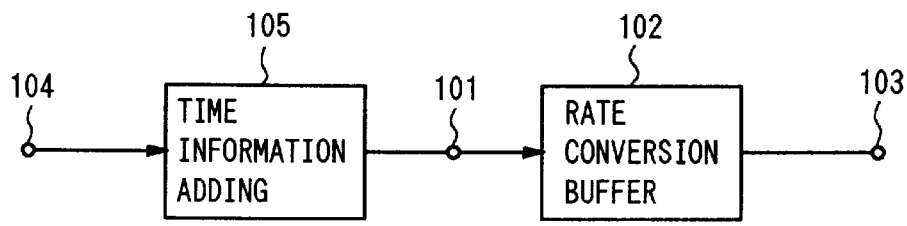
Fig. 26
| RECORDING MODE | RECORDING RATE | RECORDING TIME ||
|---|---|---|---|
| | | STANDARD CASSETTE | MINI-CASSETTE |
| SD MODE | 25Mbps | 4.5 HOURS | 1 HOUR |
| 1/2-SD MODE | 12.5Mbps | 9 HOURS | 2 HOURS |
| 1/4-SD MODE | 6.25Mbps | 18 HOURS | 4 HOURS |

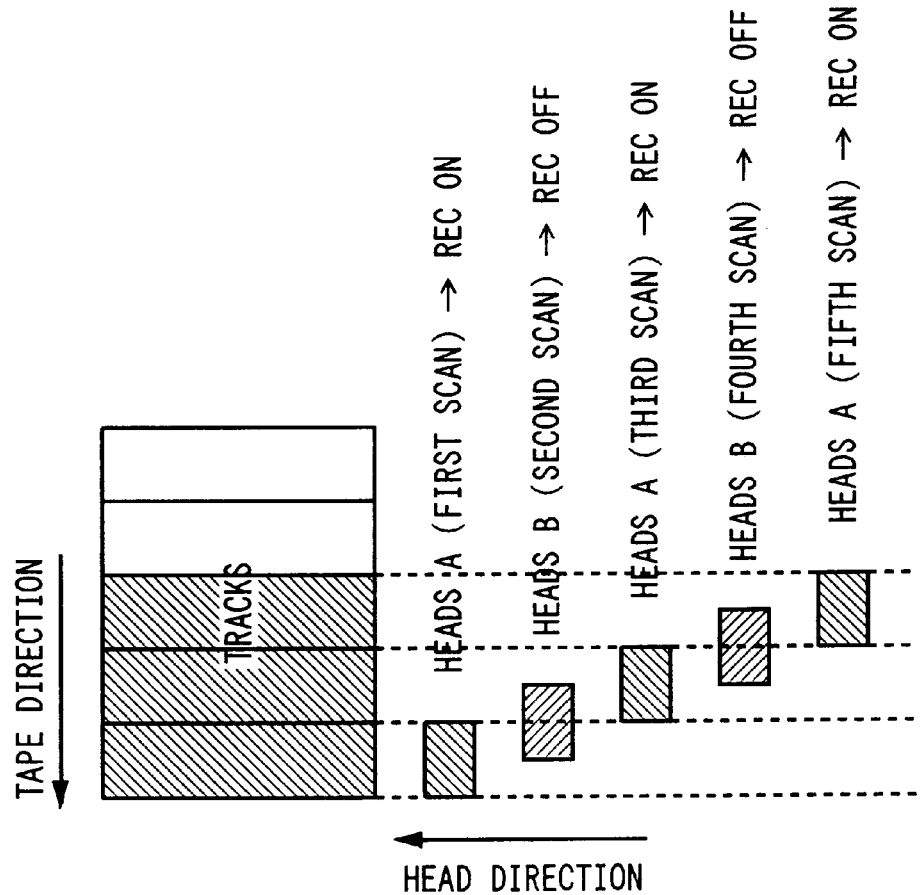
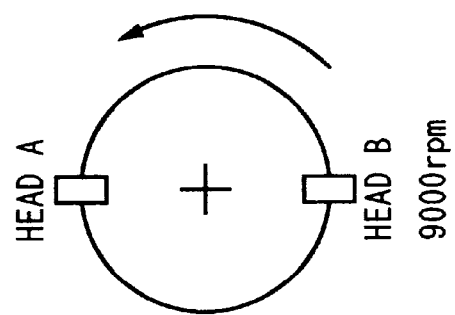
Fig. 28

METHOD AND APPARATUS FOR REPRODUCING/RECORDING AT VARIABLE SPEEDS DEPENDENT UPON THE BIT RATE OF THE MPEG ENCODED SIGNAL

This application is a continuation of application Ser. No. 08/558,914, filed on Nov. 13, 1995.

BACKGROUND OF THE INVENTION

The invention relates to digital data recording/reproducing apparatus and method for recording/reproducing a bit stream of an MPEG2 signal onto/from a magnetic tape at variable speeds dependent upon the bit rate of the encoded bit stream.

Progress is being made in the development of digital VTRs which compress a digital video signal by DCT (Discrete Cosine Transform) and variable length encoding and record the signal onto a magnetic tape by rotary heads. In such digital VTRs, modes for recording a video signal of the NTSC system or the like (hereinafter, referred to as an SD mode) and for recording a video signal of the HDTV system (hereinafter, referred to as an HD mode) can be set. In the SD mode, the video signal is recorded at a rate of 25 Mbps. In the HD mode, the video signal is recorded at a rate of 50 Mbps. Techniques for recording a bit stream of an MPEG2 (Moving Picture Experts Group) signal with such a digital VTR are being studied. The transport packets of the MPEG2 signal can be a signal of a digital CATV or the like.

In MPEG2, a multiprogram function is provided which enables a plurality of programs to be transmitted, individual encoding streams are time divisionally multiplexed on a relatively short unit basis called a transport packet. The transport packet is set to a fixed length of 188 bytes. A header portion contains content identification information of the transport packet. A transport packet necessary to reproduce a target program is selected and decoded using such information.

FIGS. 23A–D show a construction of the transport packet. As shown in FIG. 23A, the transport packet is composed of a header and a payload, the latter stores data information. As shown in FIG. 23B, the header comprises: sync data of eight bytes; a transport error indicator indicative of the presence or absence of an error in the packet; a payload unit start indicator indicative of the start of a payload unit; a transport priority indicator indicative of the significance of the packet; packet identification data (PID) indicative of an individual stream of the packet; transport scramble control data indicative of the presence and the kind or the absence of a scramble of the payload; adaptation field control data indicative of the presence or absence of an adaptation field; a continuity counter to detect whether a part of the packet has been abandoned; and an adaptation field which can be used to insert additional information regarding the individual stream and a stuffing byte.

As shown in FIG. 23C, the adaptation field includes: adaptation field length data indicative of a length of the adaptation field; a discontinuity indicator indicating that the system clock is reset and that new contents are being obtained; a random access indicator indicative of an entry point of random access; a priority stream elementary indicator indicating that an important portion exists in such a payload; a flag; an optional field; and a stuffing byte.

As shown in FIG. 23D, the optional field includes: PCR data; OPCR data; a splice countdown; a transport private data length; transport private data; adaptation field extension length; a flag; and an optional field. The PCR data is a time stamp for setting and calibrating a value serving as a time reference in a MPEG decoding system. The system clock (27 Mhz) is reproduced from the PCR by a PLL (phase lock-loop) circuit and the time base information of the transport packets is held to set a system clock reference for timing the subsequent decoding process.

As shown in FIG. 24, to record a transport packet of the MPEG2 signal with a digital VTR, a program is selected from programs A, B, and C (for example, program A) which are sent in a time division multiplexed form. The selected program is a burst-like form structured on a packet unit basis. If the data rate of the multiprograms is equal to, for example, 30 Mbps and the rate of the selected program is equal to, for instance, 10 Mbps, the data rate is converted from 30 Mbps to 10 Mbps by a rate converting buffer to record the selected program.

As shown in FIG. 25A, the transport packet of the selected program is supplied from an input terminal 101 to a rate converting buffer 102. The rate converting buffer 102 reduces the data rate by a factor of three. Thus, the rate is reduced from 30 Mbps to 10 Mbps. The rate converted transport packet is outputted to an output terminal 103 and recorded by a digital VTR. For reproduction, the signal of the digital VTR is rate converted to increase the data rate by a factor of three, i.e., opposite to the rate reduction upon recording.

When the signal reproduced by the digital VTR is decoded by a set top box, the system clock (27 Mhz) is reconstructed from the PCR by the PLL. The system clock is used as a reference for the timing of the decoding process. It is, therefore, necessary to retain the time base information of the transport packet through the recording and reproduction of the signal. However, rate conversion changes the time base information of the input signal during recording. Therefore, upon reproducing, the time base cannot be returned to its original state.

In MPEG2, an I picture which was intra-picture encoded, a P picture which was forward direction prediction encoded and a B picture which was bi-direction prediction encoded are transmitted. During variable speed reproduction continuous picture data cannot be obtained, therefore, only data of the I picture is used in variable speed reproduction because data of the P and B pictures cannot be decoded.

However, when the transport packet is recorded by the VTR, transport packets including the I picture are not sufficiently read in variable speed reproduction because the position of the recorded I picture is uncertain. Therefore, data of the I picture corresponding to a specific portion of a frame is not read at the correct time during variable speed reproduction and the picture quality deteriorates.

According to a method proposed by the inventor of the present invention, before entering the rate converting buffer 102, time information from a certain reference clock (indicative of the time at which the transport packet arrives) is added to each packet of the selected program received at an input terminal 104 by a time information adding circuit 105, shown in FIG. 25B. When the same reference clock is used for reproduction as for recording, the transport packet is transmitted according to the reference clock time information and the same time state as upon recording can be reconstructed during variable speed reproduction. The head sync byte (one byte) of each transport packet is eliminated and the three-byte value of the counter using the reference clock (27 MHz) is latched at the arrival time of the packet.

The selected program is thus recorded by the digital VTR. A bit rate for each program ordinarily differs in digital transmission depending on the contents of the program. As shown in FIG. 26, bit rates of a high picture quality program, such as a sports program with fast motions or the like, are higher than a program with slower or less motion, such as a music program, a movie program or the like. A bit rate of 15 Mbps is the highest bit rate of the MPEG2. Therefore, it is very wasteful if such programs are recorded at 25 Mbps in the standard mode (SD mode) of the digital VTR.

It is preferable to vary the recording speed according to the bit rate of the program to more efficiently record the signal. Three modes: SD mode, ½-SD mode, and ¼-SD mode can be used. In the ½-SD mode, the tape speed is reduced by a factor of two compared to the SD mode. In the ¼-SD mode, the tape speed is reduced by a factor of four compared to the SD mode. Recording rates and recording times in the respective modes are shown in FIG. 27.

Using FIG. 26 as an example, the ¼-SD mode is selected for recording/reproducing a program such as the movie program, the music program or the like whose rate is equal to or less than 6.25 Mbps. The ½-SD mode is selected for recording/reproducing a program such as a high picture quality program, a sports program or the like whose rate is equal to or less than 12.5 Mbps. The SD mode is selected for recording/reproducing a program having a bit rate exceeding 12.5 Mbps. The bit rate of the selected program is converted to the recording bit rate in each mode by rate converting buffer 102 and a dummy data adding circuit. For instance, by adding dummy data, a string of bits equal to "0", the amount of data recorded to one track in each mode is equalized.

According to the digital VTR shown in FIG. 28, heads A and B are provided on a drum, 180° apart, which rotates at 9000 r.p.m. and a magnetic tape (not shown) is wrapped around the peripheral surface of the drum at a wrap angle that is slightly larger than 180°. The azimuth angles of the gaps of heads A and B are different. Thus, crosstalk from the adjacent tracks can be suppressed upon reproduction and recording can be performed without a guard band.

When the mode is set to the ½-SD mode, the signal is recorded on the tape as shown in FIG. 28. In FIG. 28 (and other drawings explained hereinlater) oblique tracks are shown as vertical tracks and oblique lines show azimuth angles for simplicity. On the first scan, head A records the data and head B does not record any data. The same operation holds for the third scan. No data is recorded on the even-numbered scans. Recording is performed by head A or B on designated odd-numbered scans. The tracks in the ½-SD mode are formed at the same track pitch as in the SD mode.

As will be understood from FIG. 28, recording is only performed by head A, so that the suppression of crosstalk via azimuth loss is not possible. A similar problem occurs in recording and reproduction in the ¼-SD mode. When the tape running speed is reduced by an odd factor, such as for a ⅓-SD mode, compared to the tape speed in the SD mode, crosstalk can be suppressed via azimuth loss. However, using odd fraction speed modes limits the range from which recording rates can be selected.

OBJECTS AND SUMMARY OF THE INVENTION

It is, therefore, an object of the invention to provide a digital data recording/reproducing apparatus and method which can record/reproduce adjacent tracks by heads of different azimuth angles at a tape speed, reduced by an even fractional factor, lower than that of the standard mode.

It is a further object of the invention to provide digital data recording/reproducing apparatus and method which can correctly keep a time base for reproduction even when transport packets are rate converted when recorded.

Another object of the invention is to provide digital data recording/reproducing apparatus and method, in which picture quality during variable speed reproduction does not deteriorate even when the transport packets are rate converted when recorded.

The recording digital data is simultaneously recorded to two tracks by the rotary heads A and B which have a height difference of one track pitch, have different azimuth angles and are integrally constructed. For tape speeds of 1/N, recording is executed at a rate of once per N scans. Thus, the azimuths of adjacent tracks are different. Heads having different azimuth angles record data to tracks at different angles, these tracks are herein referred to as having different azimuths.

In the SD mode, recording is performed by rotary heads A and B on each scan. In the ½-SD mode, the recording is alternatively performed every scan by heads A and B. Thus, data recorded on adjacent tracks have different azimuths and the skipped scan provides that there will be no overwriting of data in the ½-SD mode.

When the transport packet of the selected program is rate converted and recorded by the digital VTR, the arrival time information of the transport packet is added to each transport packet based on a reference clock. Thus, the original time base state before recording can be reconstructed during signal reproduction based on this time information and the reference clock.

In the recording and reproduction of the digital VTR, since the rotation of the drum is synchronized with the reference clock, thus the tape speed mode is selected depending on the bit rate of the transport packs.

Trick play areas TP1 and TP2 for high variable speed reproduction and low variable speed reproduction are provided and arranged in tracks with different azimuth angles, respectively. The data of the I picture is recorded in the trick play areas TP1 and TP2. During variable speed reproduction, the data in the trick play areas TP1 and TP2 is read. Thus, the picture quality during variable speed reproduction is improved. By using only tracks of one azimuth for each trick play area, the trick play areas TP1 and TP2 for the high variable speed reproduction and low variable speed reproduction are arranged in tracks with different azimuths. Therefore, the head construction of the apparatus is not limited.

BRIEF DESCRIPTION OF THE DRAWINGS

The following detailed description, given by way of example and not intended to limit the present invention solely thereto, will best be understood in conjunction with the accompanying drawing, where like parts are labeled with like numerals, in which:

FIG. 1 illustrates a head construction of a digital VTR and its azimuth tracks according to the present invention.

FIGS. 16 A–B illustrate the arrangement of the sync blocks on each track.

FIG. 17 illustrates the tape speed in various modes for reproducing/recording trick play area 1 in speed lock mode.

FIG. 18 illustrates the tape speed in various modes for reproducing/recording trick play area 1 in phase lock mode.

FIG. 19 illustrates the tape speed in various modes for reproducing/recording trick play area 2 in phase lock mode.

FIGS. 23A–D illustrates the construction of a transport packet of the present invention.

FIGS. 25A–B is a block diagram of a circuit for rate converting and adding timing information to transport packets of the MPEG2 signal.

FIG. 26 shows examples of bit rates according to the contents of a program of the transport packet.

FIG. 28 illustrates a head construction of a previously proposed digital VTR and its recording operation.

DETAILED DESCRIPTION OF THE PREFERRED EMBODIMENTS

An embodiment of the invention will now be described. As mentioned above, the transport packets of the MPEG2 signal arrive via a digital CATV or the like and have a plurality of bit rates which are equal to or less than the highest MPEG rate of 15 Mbps depending upon the contents of the program. Three recording/reproducing modes corresponding to the bit rates of the packets are used in the present embodiment.

The first mode is the SD mode for recording/reproducing a digital video signal whose bit rate is from 12.5 to 25 Mbps. The second mode is the ½-SD mode for recording a digital video signal whose bit rate is from 6.25 to 12.5 Mbps. The third mode is the ¼-SD mode for recording/reproducing a digital video signal whose bit rate is less than 6.25 Mbps. In the ½-SD mode, the tape speed is reduced by a factor of two compared to the tape speed of the SD mode. In the ¼-SD mode, the tape speed is reduced by a factor of four compared to the speed of the SD mode. Mode selection is performed by detecting rate information in the header of each transport packet of the MPEG2 signal.

Figure 2:
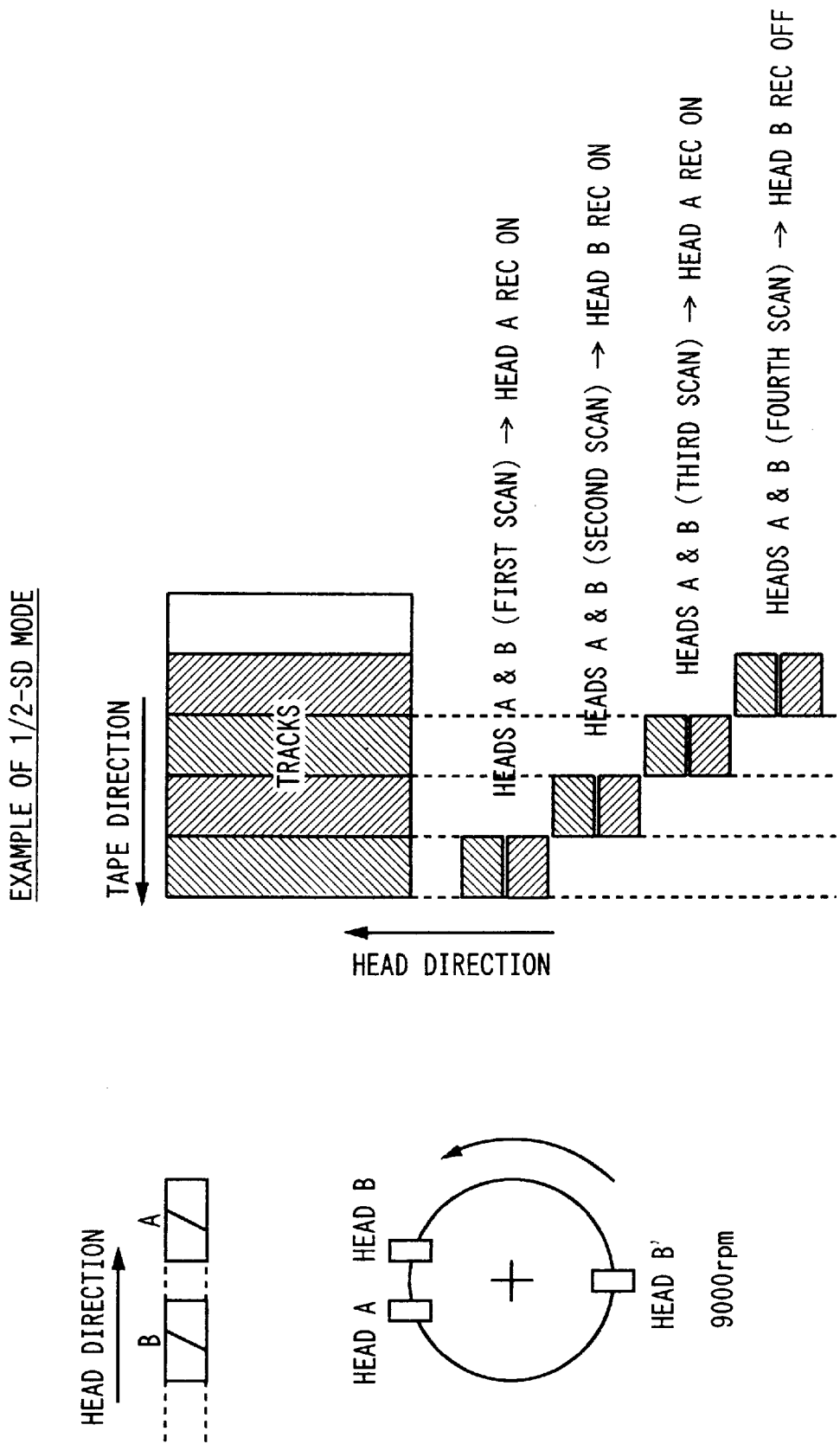
FIG. 2 illustrates another head construction of a digital VTR and its azimuth tracks according to the present invention.

The head constructions shown in FIGS. 1 and 2 are embodiments which enable recording/reproduction at the reduced speed to/from adjacent tracks having different azimuths. One example of the head construction will be explained with reference to FIG. 1. The head of FIG. 1 has a double azimuth structure; heads A and B have different azimuth angles, are integrally constructed, are arranged at sufficiently close positions on the drum which rotates at 9000 r.p.m. and are provided with a height difference of one track pitch TP (=10 μm).

With this double azimuth structure, recording is performed in the ½-SD mode on the first tape scan and no recording is performed on the next scan. The recording is performed at a rate of once every two scans. The tape (not shown) is wrapped around the drum at an angle which is slightly larger than 180°. A recording current is supplied to the heads when they are to record data to the tape. In the case of the ¼-SD mode, heads A and B only record data to the tape once every four scans. In the SD mode, recording is performed by each head on every scan.

As shown in FIG. 1 the heads record patterns having different azimuths on adjacent tracks of the tape, these tracks are recorded in the ½-SD mode at the same track pitch as tracks recorded in the SD mode. To simultaneously record with heads A and B using the head construction of FIG. 1, two systems each comprising a coder for digital modulation and a recording amplifier must be provided. Such a duplicate system is expensive, therefore it is preferred to use the construction shown in FIG. 2.

FIG. 2 shows another construction of a head structure according to the invention. In this double azimuth construction heads A and B have different azimuth angles and are integrally constructed, however, heads A and B are located at the same height and head B' for recording/reproducing in the SD mode is provided at an interval of 180° from the head A. Heads B and B' have the same azimuth angle.

In FIG. 2, an example of the recording operation in the ½-SD mode is shown. In this mode, heads A and B scan the tape and trace the same track during each rotation of the drum. The recording operation of heads A and B are alternately executed so that adjacent tracks have different azimuths. It is also possible to perform an overwrite by setting a track width of the heads to be slightly larger than the track pitch. In FIG. 2, the recording is performed by head A in the first scan and by head B in the next scan. In the ¼-SD mode, since the tape speed is reduced by a factor of four compared to the SD mode, the recording is performed by head A in the first scan and by head B in the third scan; no recording is performed in the second and fourth scans.

The tracks are formed on the tape with a predetermined track pitch and the azimuths are different between adjacent tracks. In the head construction of FIG. 2, since heads A and B alternatively record data to the tracks in the ½-SD mode, there is no need to provide two systems of channel coders as required by the head construction of FIG. 1. Thus, the size and cost of the circuit can be reduced.

Figure 3:
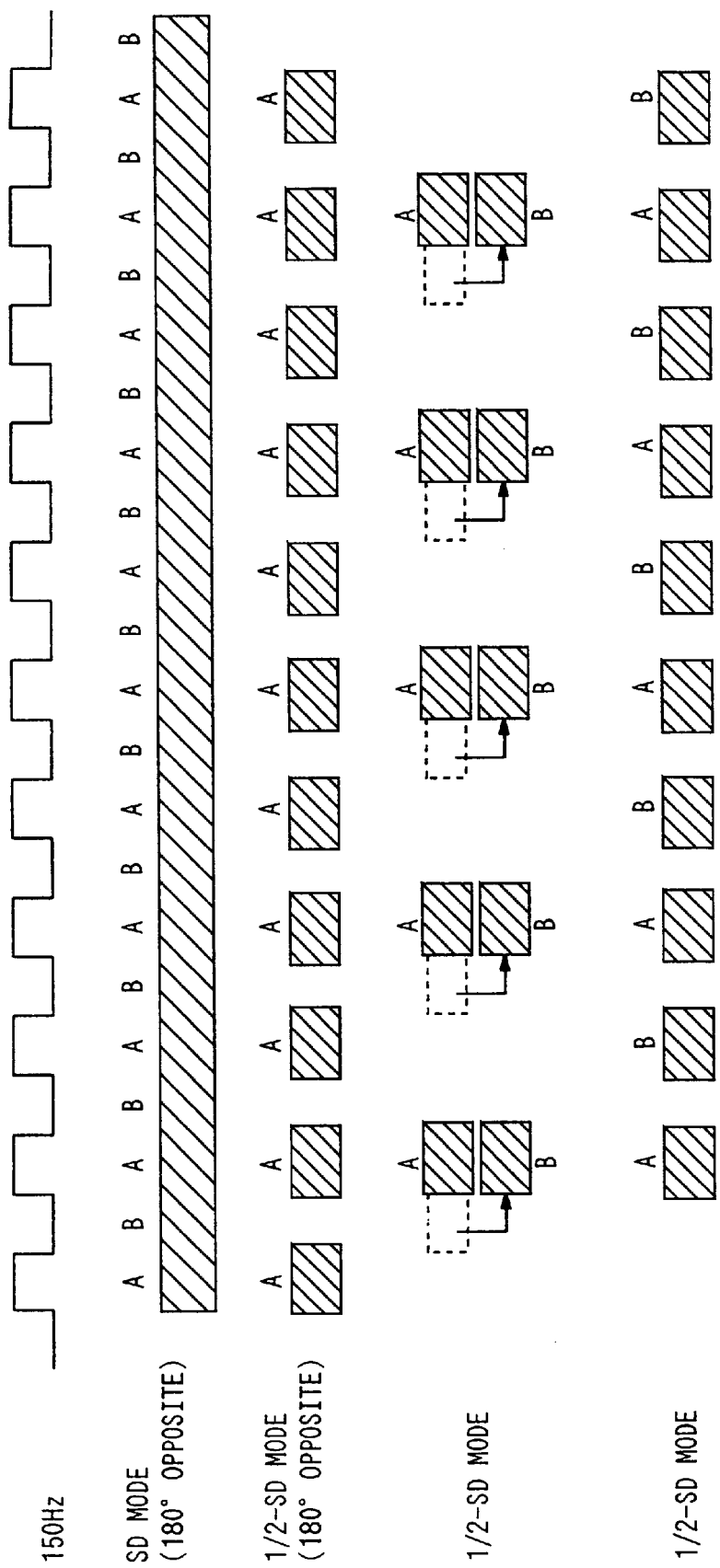
FIG. 3 is timing chart showing the operation of different head constructions.

FIG. 3 is a timing chart for the recording operation performed by the aforementioned head constructions. A pulse signal of 150 Hz is synchronized with the rotation of the drum and one period corresponds to one rotation of the drum. In the SD mode for recording the digital video signal by the heads positioned of 180° apart (described in the Background of the Invention), two heads alternately perform the recording operation. Using this head construction in the ½-SD mode, recording is only performed by head A and azimuth recording is not performed.

In the ½-SD mode, the head constructed according to FIG. 1 records the video signal simultaneously with the two heads, as shown in the second timing chart from the bottom in FIG. 3. As shown in the bottom timing chart in FIG. 3, the recording is alternated when heads A and B, constructed according to FIG. 2, respectively scan the tape. Thus, data is recorded to adjacent tracks having different azimuths.

Although the present embodiment relates to an example in which the tape speed is reduced by an even factor from the tape speed of the SD mode, the head constructions of FIGS. 1 and 2 can also be used when the tape speed is reduced by an odd factor from the tape speed of the SD mode.

Figure 4:
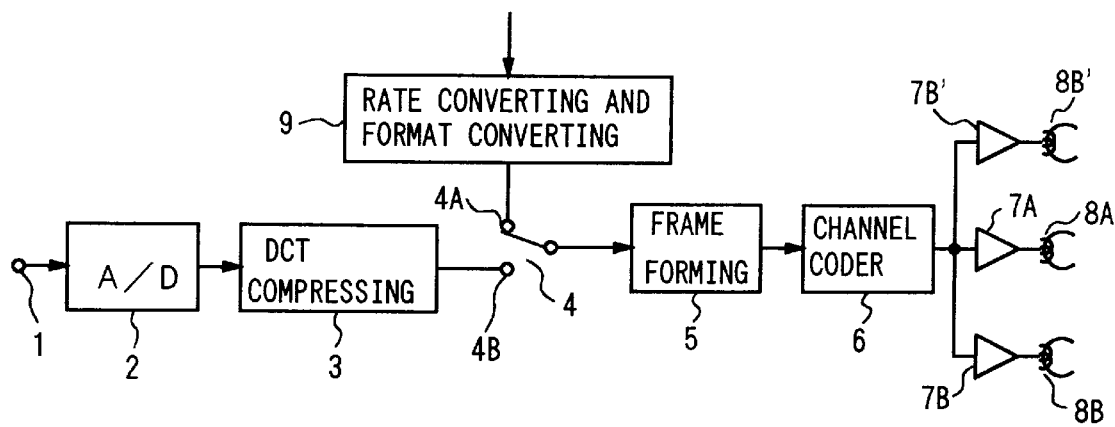
FIG. 4 illustrates a recording system of a digital VTR of the present invention.

FIG. 4 shows a block circuit diagram of the recording system of a digital VTR according to the present invention. In FIG. 4, an input terminal 1 receives a video signal of a television system, such as the NTSC system or the like. During a record operation, a video signal supplied to input terminal 1, is supplied to an A/D converter 2. The video signal is converted to a digital signal by the A/D converter. A DCT compressing circuit 3 compresses the digital signal by DCT conversion and variable length encoding. Thus, the digital signal from the A/D converter is divided into blocks, shuffled and DCT converted. An output of the DCT compressing circuit is set to equal lengths based on a predetermined buffering unit (not shown). The system generates a quantization table so that the length of total code is equal to or less than a predetermined length. The video signal in quantized in this optimized quantization table, variable length encoded and divided into frames.

Switching circuit 4 is connected to terminal 4A when the transport packet of the MPEG2 signal is recorded and to terminal 4B when the video signal from input terminal 1 is recorded. The transport packet of the MPEG2 signal is supplied to terminal 4A of the switching circuit through a rate conversion and format converting unit 9. The video signal from input terminal 1 is supplied to terminal 4B from the DCT compressing circuit.

The rate conversion and format converting unit selects a program from the transport packet of the MPEG2 signal and converts the rate of the selected program to a predetermined rate for each of the three modes. The data in the trick play area is arranged to reproduce the best picture during variable speed reproduction.

An output of switching circuit 4 is supplied to a frame forming circuit 5. The frame forming circuit forms the data into a predetermined frame and performs error correction encoding. An output of the frame forming circuit is supplied to a channel coder 6 to be digitally modulated. An output of the channel coder, either a compressed video signal or a transport packet of the MPEG2 signal, is recorded to the tape.

An output of channel coder 6 is distributed to recording amplifiers 7A, 7B, and 7B' through a head selecting circuit (not shown) and supplied to rotary heads 8A, 8B and 8B', respectively when the head assembly is constructed according to FIG. 2. A head selecting circuit distributes the recording signal to the recording amplifiers 7A, 7B, and 7B' according to whether the SD mode, the ½-SD mode, or the ¼-SD mode is active. The tape speed is also changed according to the selected mode. The tape speed can be changed by supplying a mode instruction signal to a servo circuit of a capstan motor (not shown).

During the recording of the transport packet of the MPEG2 signal, switching circuit 4 is connected to terminal 4A. The transport packet of the MPEG2 signal inputted through rate conversion and format converting unit 9 is divided into frames by frame forming circuit 5, modulated by channel coder 6 and recorded to the magnetic tape by rotary heads 8A and 8B.

During the recording of a video signal input to input terminal 1, switching circuit 4 is connected to terminal 4B. The video signal is converted to a digital signal by A/D converter 2, compressed in DCT compressing circuit 3, divided into frames by frame forming circuit 5, modulated by channel coder 6 and recorded to the magnetic tape by rotary heads 8A and 8B'.

As mentioned above, to record the transport packet of the MPEG2 signal, one program of the multiprograms is selected by rate conversion and format converting unit 9, the bit rate of the selected program is detected and the appropriate mode is selected. The rate of the program can be converted, for example, from 30 Mbps to 12.5 Mbps by a buffer and a dummy data adding circuit. The rate conversion changes the time base information during recording, therefore, to return the data to the same time base during reproduction as existed before recording, the rate conversion and format converting buffer 9 adds time base information, representing the arrival time of the transport packet, to each transport packet of the MPEG2 signal based on the reference clock. The same time base state can be reproduced during reproduction as existed before recording by using the same reference clock during recording and reproduction and by transmitting the transport packet to be reproduced according to the added time base information.

Figure 5:
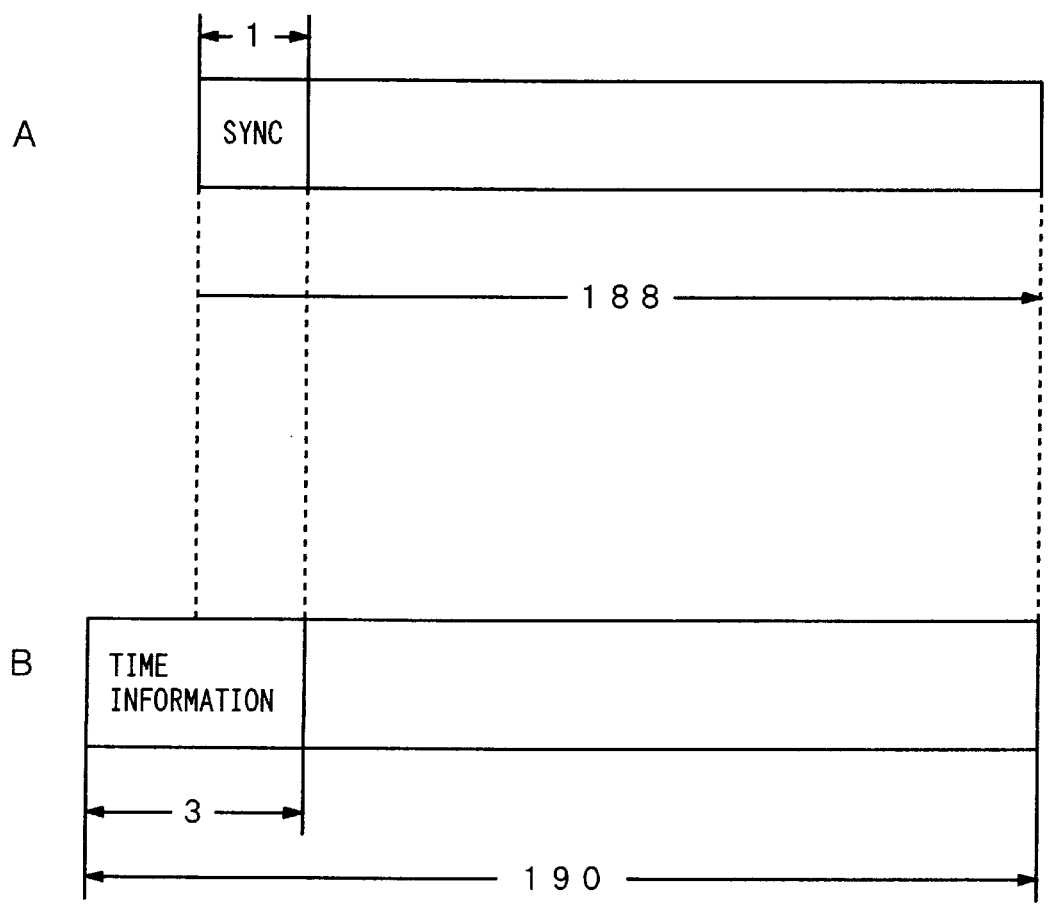
FIGS. 5A–B illustrates the addition of time information to a transport packet.

As shown in FIG. 5A, sync data of eight bytes is added to the header of the transport packet. During the recording of the transport packet of the MPEG2 signal, one byte of the sync data is eliminated and time information of three bytes is added as shown in FIG. 5B. This time information enables the original time base to be reproduced from the rate converted data.

Figure 6:
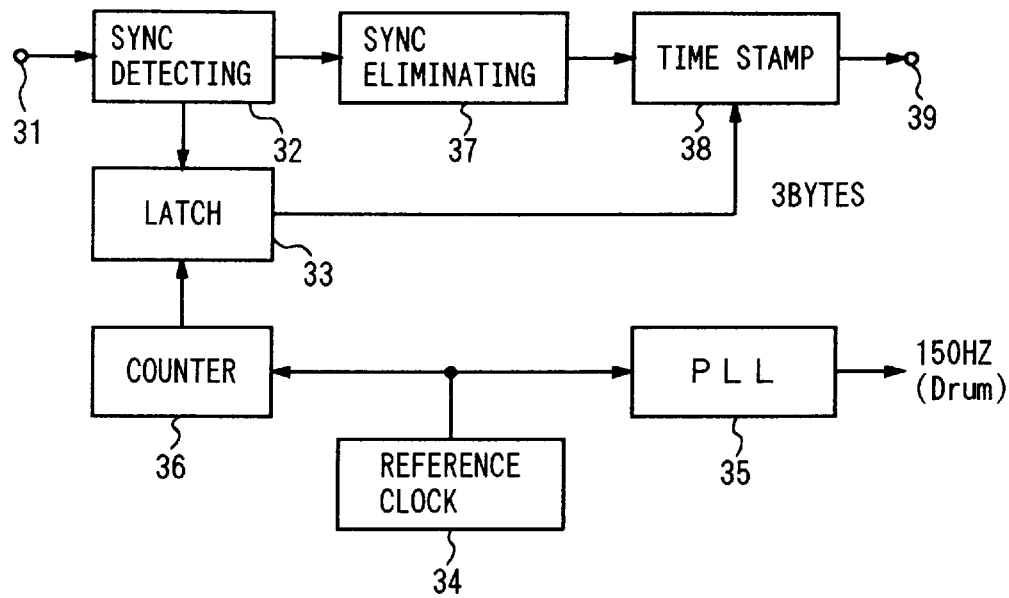
FIG. 6 is block diagram of the circuit for adding the time information to a transport packet.

FIG. 6 shows a block diagram of a circuit used to add the time information of three bytes, shown in FIG. 5B, to the transport packet before it is rate converted and recorded. The circuit shown in FIG. 6 is included in rate conversion and format converting circuit 9 of FIG. 4. In FIG. 6, the transport packet is supplied to an input terminal 31 before the rate conversion. The transport packet is supplied to a sync detecting circuit 32. The sync detecting circuit detects the sync data in the header of the transport packet. A detection output of the sync detecting circuit is supplied to a latch 33. Another output of the sync detecting circuit 32 is supplied to a sync eliminating circuit 37. When the sync is detected, sync eliminating circuit 37 eliminates one byte of the sync. An output of sync eliminating circuit 37 is supplied to a time stamp circuit 38.

A reference clock 34 generates the reference clock of, for example, 27 MHz. The reference clock is supplied to a PLL 35 and to a counter 36. Based on an output of PLL 35, the drum is rotated at, for example, 150 Hz (9000 r.p.m.). The rotational speed of the drum is constant irrespective of the mode.

The output of reference clock 34 is counted by counter 36. Time information is derived from an output of the counter. The time information is supplied from the counter to latch 33. When the sync of the transport packet is detected by the sync detecting circuit 32, the time information is latched in latch 33. The sync of one byte is eliminated by the sync eliminating circuit 37. The time information of three bytes is added to the transport packet by time stamp circuit 38. An output of the time stamp circuit is outputted from an output terminal 39.

As mentioned above, an output of reference clock 34 is supplied to PLL 35. The drum is rotated by the output of the PLL. The rotation of the drum is synchronized with the reference clock during recording and reproduction. Thus, the original time base information can be reconstructed during reproduction.

Figure 7:
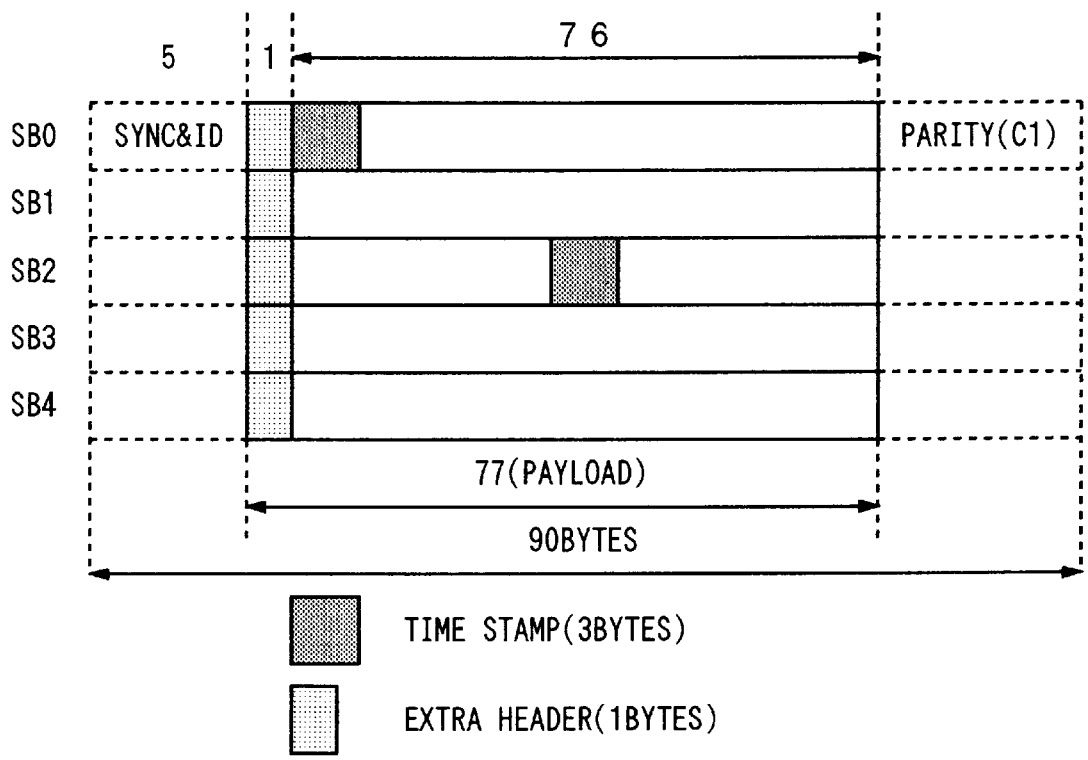
FIG. 7 illustrates the arrangement of transport packets in a sync block.

The transport packet consists of 188 bytes. When the sync data of one byte is eliminated and the time information of three bytes is added, the transport packet consists of 190 bytes, as shown in FIGS. 5A and B. Two packets of 190 bytes are packed in five sync blocks as shown in FIG. 7.

Figure 8:
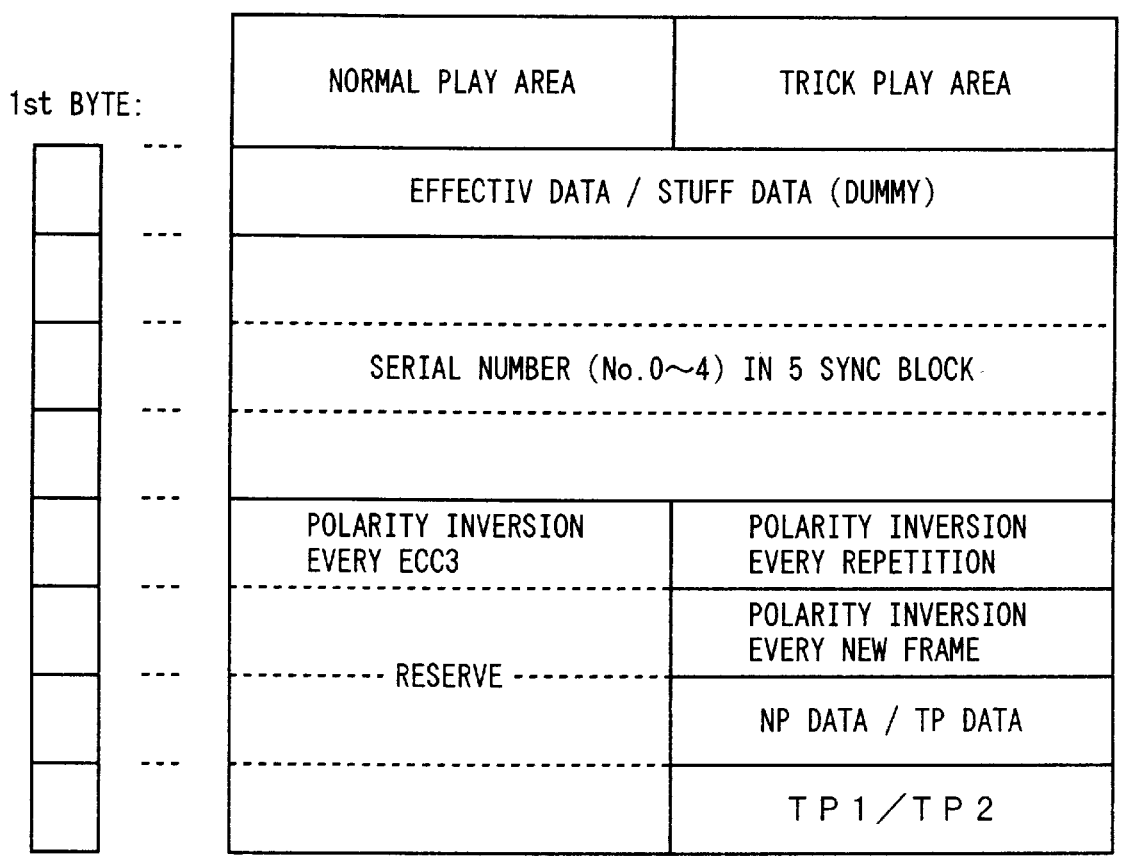
FIG. 8 illustrates the addition of the extra header to the sync blocks of FIG. 7.

For use in a digital VTR, one sync block is constructed of 90 bytes. Five bytes are added at the head representing the sync and an ID. A parity of one byte and a payload of 77 bytes per sync block is set. An extra header of one byte is added to each sync block, as shown in FIG. 8. The extra head stores a serial number or the like of the five sync blocks. The remaining 76 bytes of the payload are allocated for recording the transport packet. In five sync blocks, 380 bytes remain:

$$5 \times 76 = 380 \text{ bytes}$$

Therefore, two packets, each consisting of 190 bytes to which the three byte time information was added, can be stored in 5 sync blocks:

$$2 \times 190 = 380 \text{ bytes}$$

According to an embodiment, the reproducible area is set to the trick play area at the time of the variable speed reproduction to improve the picture quality. Transport packets containing I pictures are recorded in the trick play areas. The I picture is a picture which was intra-picture prediction encoded in the MPEG2 format. A reproduction image is obtained upon variable speed reproduction, by using only the I picture. The transport packet containing an I picture is recorded into trick play areas (area TP1 for high variable speed reproduction and area TP2 for low variable speed reproduction) on the reproducible track.

When the recording rate of the digital VTR is 25 Mbps in the SD mode and the transport packet is recorded at 10 Mbps, the VTR has a surplus recording rate. Therefore, the I picture can be overlappingly recorded to the trick play area, so that the picture can be reproduced during variable speed reproduction.

Figure 9:
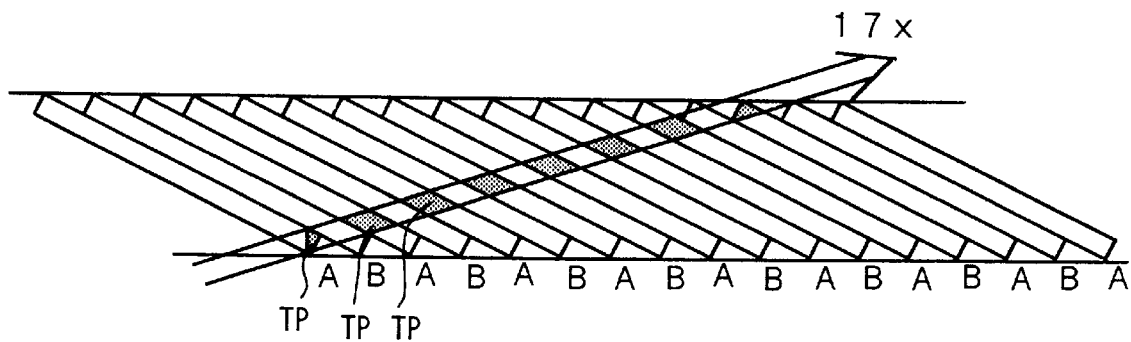
FIG. 9 illustrates the location of the trick play areas on the tracks.
Figure 10:
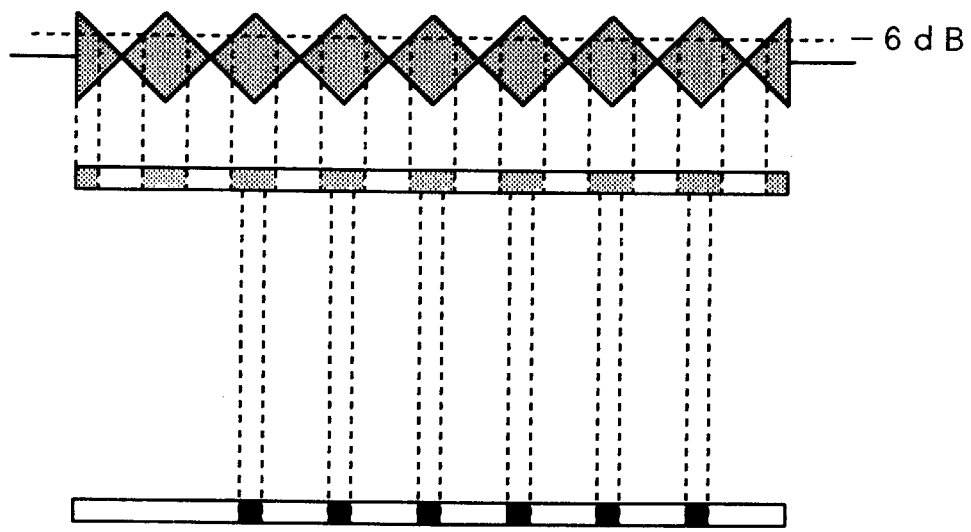
FIG. 10 is a waveform diagram explaining the reproduction bursts from the trick play areas.

FIG. 9 shows a locus of the head upon variable speed reproduction. As shown in FIG. 9, when the head traces the tracks, a portion shown by TP is the reproducible area. The reproducible area TP is used as a trick play area to record transport packets for variable speed reproduction. In a VTR employing helical scan and azimuth recording, the data which is reproduced from the TP has a burst-like shape, as shown in FIG. 10. By fixing the position of the reproducible area on the track by an Automatic-Tracking Function (ATF) or the like and by recording the transport packet, including the I picture, into the reproducible area TP, the data of the I picture can be reproduced during variable speed reproduction.

According to the invention, two kinds of trick play areas TP1 and TP2 are provided. One trick play area TP1 is used for high variable speed reproduction. The other trick play area TP2 is used for low variable speed reproduction. The trick play areas TP1 and TP2 are provided on tracks of different azimuths.

Figure 11:
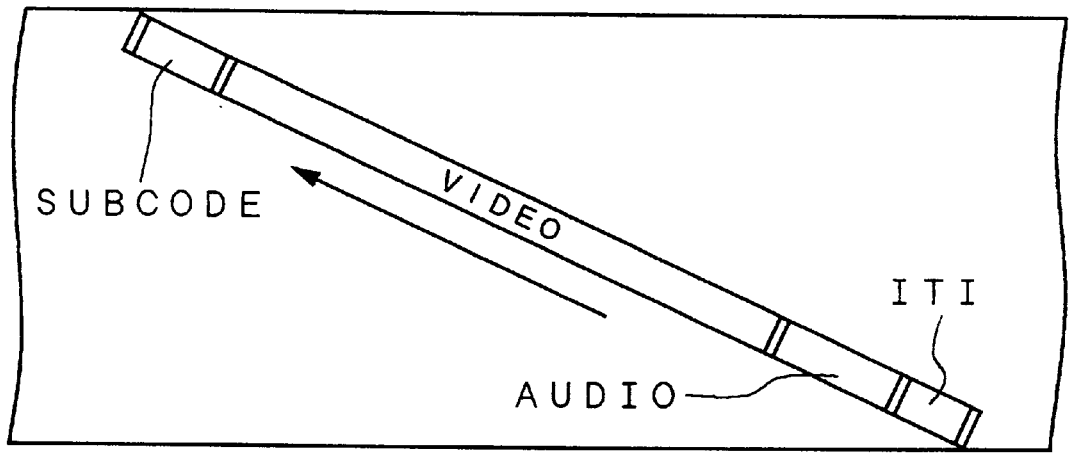
FIG. 11 illustrates the arrangement of data on the tracks.

As shown in FIG. 11, a track is divided into an ITI sector which is used for after-recording or the like, an audio sector, a video sector, and a subcode sector which is used for searching or the like. Two heads arranged at opposite positions of 180° or a double-azimuth head can be used as a head construction to trace the track. A pilot signal is multiplexed to perform ATF tracking.

Figure 12:
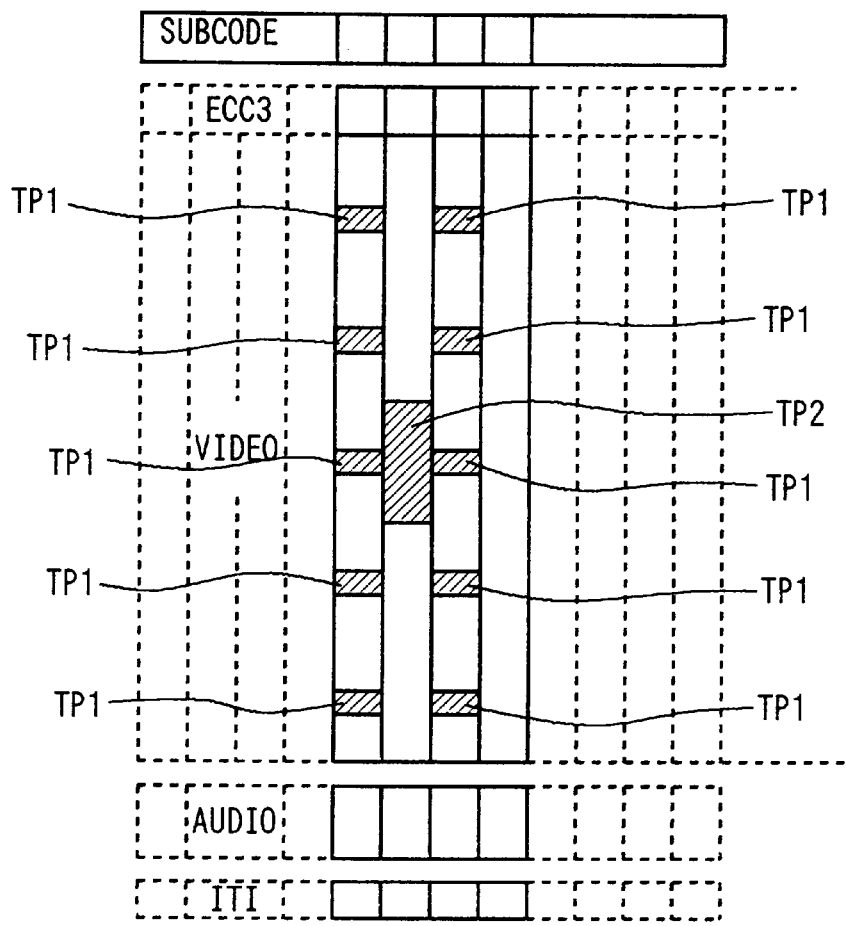
FIG. 12 illustrates a further division of tracks of FIG. 11.

As shown in FIG. 12, trick play area TP1 for high variable speed reproduction is designated. For instance, a track of a pilot signal f0 is an area which can be reproduced at 18-times speed. Data is repetitively recorded 18 times in the trick play area TP1. The trick play area TP2 for the low variable speed reproduction is designated in areas which can be reproduced at 4-times speed, such as tracks other than the track for pilot signal f0. The same data is repetitively recorded twice in the trick play area TP2.

As mentioned above, the trick play areas TP1 and TP2 are arranged in tracks having different azimuths. By using a track of only one azimuth for each of the trick play areas TP1 and TP2, the performance of variable speed reproduction is not limited by head construction such as two heads arranged at opposite positions of 180° or the like.

When a phase lock is performed, the tracking information in the tracks of the pilot signals other than f0, is easily influenced by an attaching error of the heads or the like because tracking information is obtained from the track of the pilot signal of f0. Therefore, the trick play area TP2 for low variable speed reproduction is arranged in the tracks of the pilot signals other than f0. The trick play area TP1 for high variable speed reproduction is arranged in the track of the pilot signal f0. The trick play areas are located in this manner because the surplus for tracking deviation in the 4-times speed is larger than in the 18-times speed, 25 sync blocks and 5 sync blocks, respectively.

The same data is repetitively recorded 18 times in the trick play area TP1 for high variable speed reproduction. The same data is repetitively recorded twice in the trick play area TP2 for low variable speed reproduction.

Figures 13, 15A, 15B:
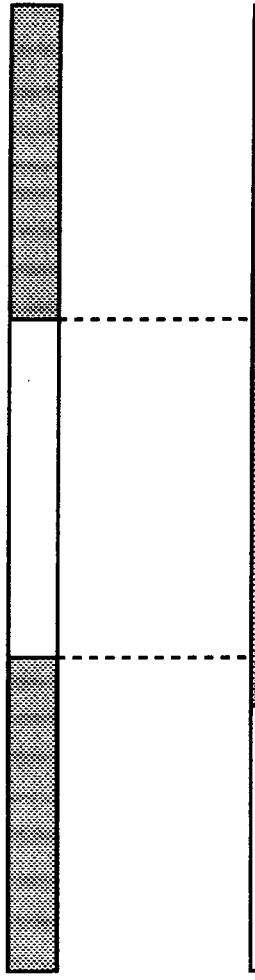
FIG. 13 illustrates speeds of trick of play areas given various head instructions in either speed or phase lock.
FIGS. 15A–B illustrate the portions of the track read according to the trace in FIG. 14.

Therefore, the tape speeds that can be realized are as shown in FIG. 13.

Figure 14:
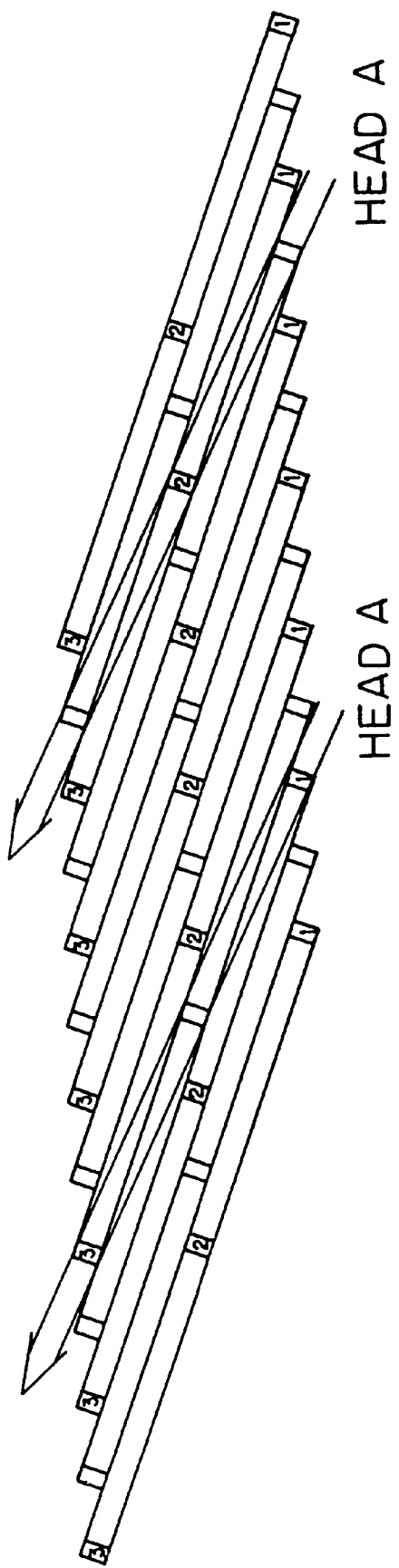
FIG. 14 illustrates tracing of a track at speed higher than ordinary speed.

When the tape speed for variable speed reproduction is set to a (N+0.5)-times speed such as 1.5-times speed, 2.5-times speed, or 3.5-times speed, as shown in FIGS. 14 and 15A–B all of the portions of the tracks having the same azimuth can be reproduced in two scans. FIG. 13 shows the case where the maximum variable reproduction speed is set to a 7-times speed and the variable speed reproduction is performed at a 3.5-times speed. As shown in FIGS. 15A–B, the portions at both ends of the track of the same azimuth are reproduced by the first scan and the center portion of the track of the azimuth is reproduced by the second scan, therefore, the entire track is reproduced in two scans. By repetitively recording the same trick play data to the tracks of the same azimuth, all of the data on one track of the tracks with the same azimuth can be reproduced in two scans. Therefore, by repetitively recording the trick play data to the tracks of the same azimuth, the trick play data will be reproduced at (N+0.5)-times speed such as 1.5-times speed, 2.55-times speed, or 3.5-times speed.

FIG. 16A shows an arrangement of the sync blocks on each track. There are 135 sync blocks on one track. As shown in FIG. 16A, the normal play area and trick play area TP1 are positioned on track T0 and T2. The normal play area and trick play area TP2 are positioned on track T1. Only the normal play area is located on track T3, track T3 does not contain either trick play area TP1 or TP2.

When the trick play areas TP1 or TP2 are positioned on a track, as many as 25 sync blocks are used to store the data. The normal play areas as many as 101 sync blocks are used. Error correction codes ECC3 require as many as nine sync blocks. Since two transport packets are stored in five sync blocks, it is preferred that the number of sync blocks for each of the trick play areas TP1 and TP2 be an integer multiple of five sync blocks.

As shown in FIG. 16B, in tracks T0 and T2, five trick play areas TP1 occur on each track and data of sync block numbers 40 to 44, 62 to 66, 84 to 88, 106 to 110, and 128 to 132 is recorded therein. The trick play area TP2 is positioned on track T1 and data of sync block numbers 38 to 62 is recorded therein.

In the trick play area TP1 for high variable speed reproduction, the head is arranged at a position where both the subcode sector and the ITI sector can be read. Thus, the subcode can be also accessed during high variable speed reproduction at 18-times speed. When the speed is set to 18-times speed, the length of a burst is also short and not enough tracking error signal is derived to perform ATF control. ATF control can be performed by reading the information in the ITI sector, such as a pilot signal having a S/N ratio higher than that of the other data areas can be obtained. At the 4-times speed, since the burst is long, the ATF control can be performed without the ITI area data. Therefore, in the trick play area TP2 for the low variable speed reproduction, the head is arranged at a position where only the subcode can be read.

FIG. 17 illustrates the tape speeds which can be realized by the trick play area TP1 by locking the speed of the tape. FIG. 18 illustrates the tape speeds which can be realized by the trick play area TP1 by locking the phase of the tape. FIG. 19 illustrates the tape speeds which can be realized by the trick play area TP2 by locking the phase of the tape.

In the case where the data was recorded in the SD mode, a ratio of the tape speed to the ordinary speed corresponds with the number of times of the speed (i.e., speed multiple) for variable speed reproduction. When the data was recorded in the SD mode and the tape speed is increased to 1.25-times speed, 1.5-times speed, . . . , the speed multiple in the variable speed reproduction is also increased to 1.25 times, 1.5 times, . . . However, in the ½-SD mode or ¼-SD mode, the ratio of the tape speed to the ordinary speed does not correspond with the speed multiple in the variable speed reproduction. For example, where the data was recorded in the ½-SD mode, if the recording tape speed is increased to 1.25-times speed, 1.5-times speed, . . . , the speed multiple in the variable speed reproduction is increased to 2.5 times, 3 times, . . . . Therefore, if the speed multiple in the variable speed reproduction is set without considering whether the SD mode, ½-SD mode, or ¼-SD mode is set, confusion will result because the recording and reproduction speeds vary depending on the selected mode. For example, assuming that the digital VTR is set to a 18-times speed, although the tape recorded in the SD mode is reproduced at a 18-times speed, if the data was recorded in the ½-SD mode, the tape must be reproduced at a 36-times speed.

According to an embodiment of the invention, the speed multiple in the variable speed reproduction is set depending on the mode. If the speed is set to an 8.5-times speed, a check is made to determine if the SD mode, ½-SD mode, or ¼-SD mode was used. As shown in FIG. 17, if the mode used is determined to be the SD mode then the tape speed is set to an 8.5-times speed; if the mode is determined to be the ½-SD mode then the tape speed is set to 4.25-times speed (or 4.5-times speed); and if the mode is determined to be the ¼-SD mode then the tape speed is set to the 2.25-times speed (or 2.5-times speed).

For example, it is now assumed that the tape speed was set to a −2-times speed. In this case, as shown in FIG. 19, the tape speed is set to a −2-times speed in the SD mode. The tape speed is set to the −1.0-times speed in the ½-SD mode. The tape speed is set to the −½-times speed in the ¼-SD mode.

Figure 20:
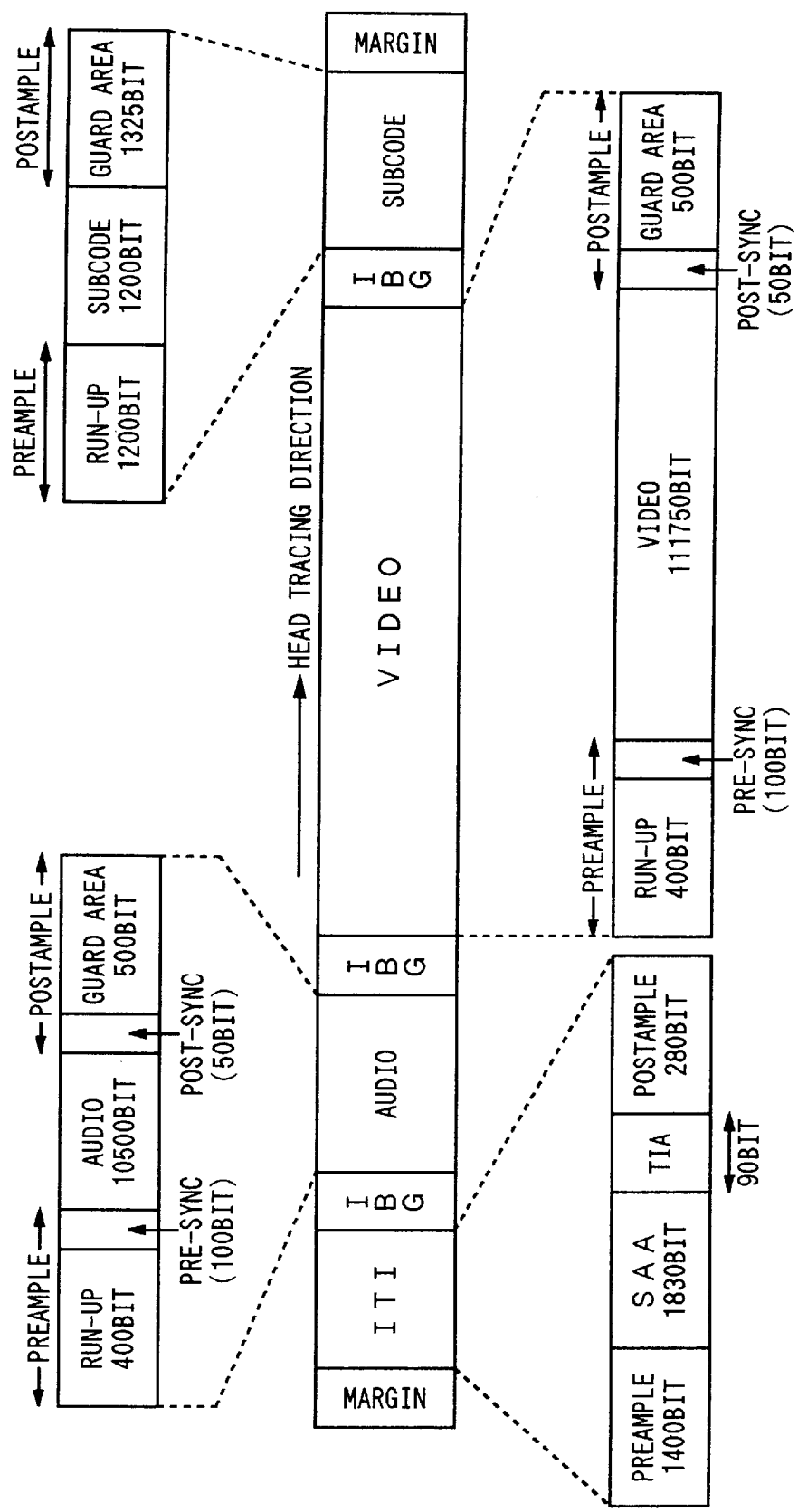
FIG. 20 illustrates a detailed breakdown of the information stored in the areas of the track of FIG. 11.

A track format of the invention will now be described. FIG. 20 shows an array of data recorded to one track. In FIG. 20, the head enters the track on the left side and leaves the track by the right side. No data is recorded in the margins or inter-block gap (IBG).

The details of the signal recorded to each area of the track, shown in FIG. 20, will now be described.

(1) ITI Area

The ITI area is constructed by: a preamble of 1400 bits; and Start-Sync Block Area (SSA) of 1830 bits; a Track Information Area (TIA) of 90 bits; and a postamble of 280 bits. The preamble functions similar to the run-in of a PLL or the like during reproduction, while the postamble provides a margin.

The SSA and TIA are constructed of SYNC blocks having a data length of 30 bits per unit. In each SYNC block data is recorded in the portion of 20 bits subsequent to a SYNC signal (ITI-SYNC) of 10 bits. Sync block numbers (0 to 60) are recorded in the SSA. APT information of three bits, recording mode (SP/LP) information of one bit, and pilot frame of a servo system are recorded in the TIA. The APT represents ID data specifying the data structure on the track.

Since each sync block in the ITI area is recorded at a fixed position on the magnetic tape, the position at which the 61st SYNC signal pattern of the SSA is detected is used as a reference to specify an after-recording position on the track. Therefore, the position to be rewritten during after-recording is specified with high precision and accurate after-recording is performed.

(2) Audio Area

An audio area for recording a PCM audio signal has a preamble and a postamble positioned before and after the audio data, respectively. The preamble is constructed by: a run-up for PLL pull-in and a pre-SYNC for pre-detection of an audio SYNC block. The postamble is constructed by: a post-SYNC to confirm the end of the audio area and a guard area which protects the audio area during the after-recording of the video data.

The pre-SYNC is constructed by two SYNC blocks. The post-SYNC is constructed by one SYNC block. An ID byte of SP/LP is recorded in the sixth byte of the pre-SYNC. The ID byte indicates SP mode when it is FFh and LP mode when it is 00 h. When the SP/LP flag recorded in the ITI area cannot be read, the ID byte of SP/LP of the pre-SYNC is used. FFh is recorded as dummy data in the sixth byte of the post-sync. The audio data which is recorded between the pre-and post-amble areas is divided into frames and parity is added.

(3) Video Area

The transport packet of the MPEG2 signal is recorded in a video area. The video area has a preamble and a postamble similar to the audio area. However, the postamble of the video area is larger than the postamble of the audio area to form a larger guard area.

Before being recorded, the video signals are processed in a frame forming circuit with video auxiliary data (video AUX data) for each track. Then an error correction code is added. The video data of 77 bytes is formed into a vertical pile of 135 (5×27) blocks. The video AUX data of three blocks is added to the upper and lower portions of the vertical pile. It is now assumed that the data of 30 DCT blocks is included in five SYNC blocks forming a buffering unit.

The 77 bytes located in the horizontal direction are encoded by a (85,77) Reed Solomon code and a parity (C1 parity) of eight bytes is formed. The 138 bytes, forming an outer code, located in the vertical direction are encoded by a (249,138) Reed Solomon code and a parity (C2 parity) of 11 bytes is formed. The encoded data with the parity bytes is read on a block unit basis and an ID of three bytes and a SYNC signal of two bytes is added to the header of each block. The resulting data is converted to one SYNC block of 90 bytes.

In an embodiment, in addition to the SD mode for recording a standard video signal, there is ½-SD mode in which the tape speed is reduced by a factor of two compared to the SD mode and a ¼-SD mode in which the tape speed is reduced by a factor of four compared to the SD mode. The mode in which the data was recorded is indicated by a mode instruction flag located in the video AUX data for use during reproduction.

(4) Subcode Area

The subcode area is provided mainly for recording information for use in a high speed search. The subcode area includes 12 SYNC blocks each having a data length of 12 bytes. A preamble and a postamble are provided before and after the subcode data. However, the preamble and postamble do not contain a pre-SYNC or a post-SYNC as in the audio and video areas. A data portion of five bytes is provided for each of the 12 SYNC blocks. A (14,10) Reed Solomon code is used to generate a parity to protect the subcode of five bytes and, thus, an inner code parity C1 is formed.

Figure 21:
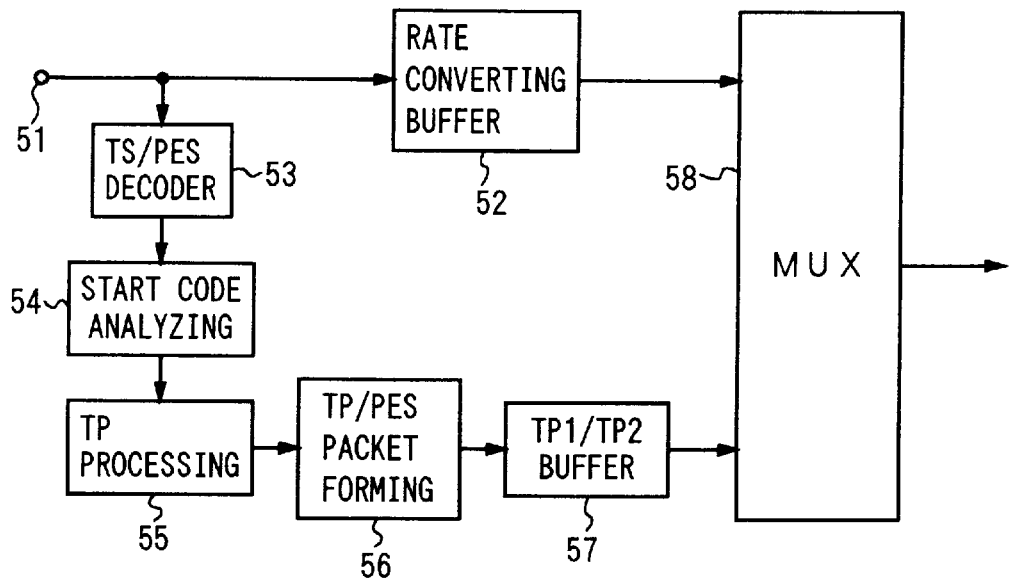
FIG. 21 is a block diagram of a circuit for a system used to set the trick play areas.

FIG. 21 is a block diagram of a circuit for recording data into trick play areas TP1 and TP2 for variable speed reproduction. In FIG. 21, the transport packet of the MPEG2 signal is supplied to an input terminal 51. The transport packet is supplied to a rate converting buffer 52 for rate conversion and to a TS/PES decoder 53. The rate converting buffer 52 converts the input data rate to a predetermined data rate according to the operation mode. If a plurality of programs are time divisionally multiplexed and transmitted as multiprograms, one program is selected from those programs and is supplied to rate converting buffer 52 and TS/PES decoder 53.

The TS/PES decoder decodes the transport packet. An output of the TS/PES decoder is supplied to a start code analyzing circuit 54. The start code analyzing circuit determines from the header information of the transport packet whether it is necessary for variable speed reproduction. The start code analyzing circuit determines whether the transport packet is necessary, that is whether it contains an I picture, from the transport priority information or the like stored in the header of the transport packet. The transport packet containing the I picture is thus identified for use in variable speed reproduction. An output of the start code analyzing circuit is supplied to a TP processing circuit 55. An output of the TP processing circuit is supplied to a TS/PES packet forming circuit 56. The TS/PES packet forming circuit forms packets to be recorded into trick play areas TP1 and TP2 for use in variable speed reproduction. High frequency coefficients can be eliminated from the data recorded into the trick play areas TP1 and TP2. An output of the TS/PES packet forming circuit is supplied to a TP1/TP2 buffer 57. Outputs of rate converting buffer 52 and TP1/TP2 buffer 57 are supplied to a multiplexer 58. The multiplexer multiplexes the outputs of the rate converting buffer 52 and TP1/TP2 buffer 57 to record the output of the rate converting buffer 52 in the normal play area and the output of the TP1/TP2 buffer to trick play areas TP1/TP2, respectively.

Figure 22:
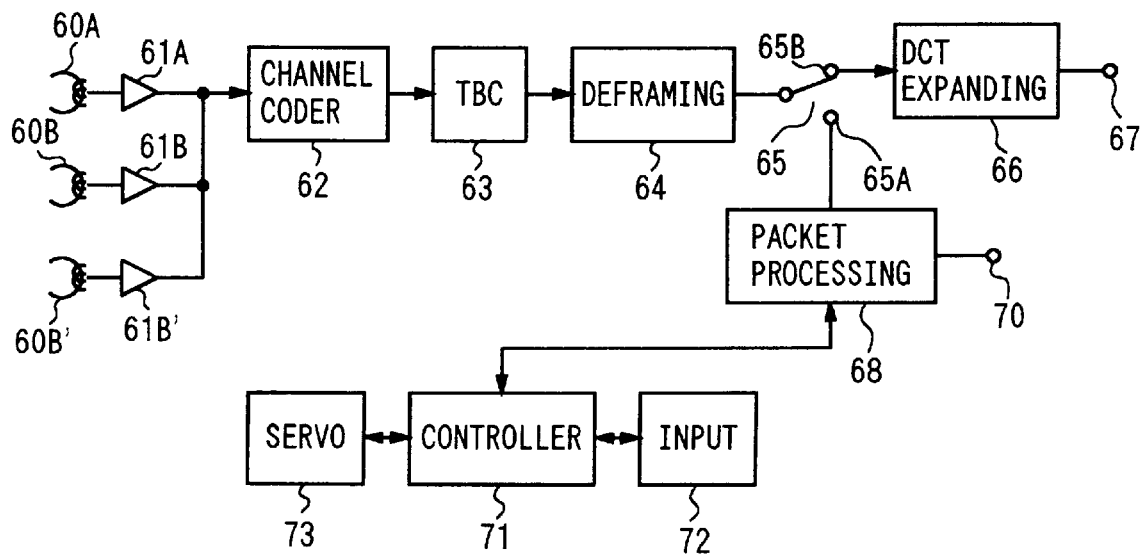
FIG. 22 is a block diagram of a circuit for a reproducing system of a digital VTR of the present invention.
Figures 24A, 24B:
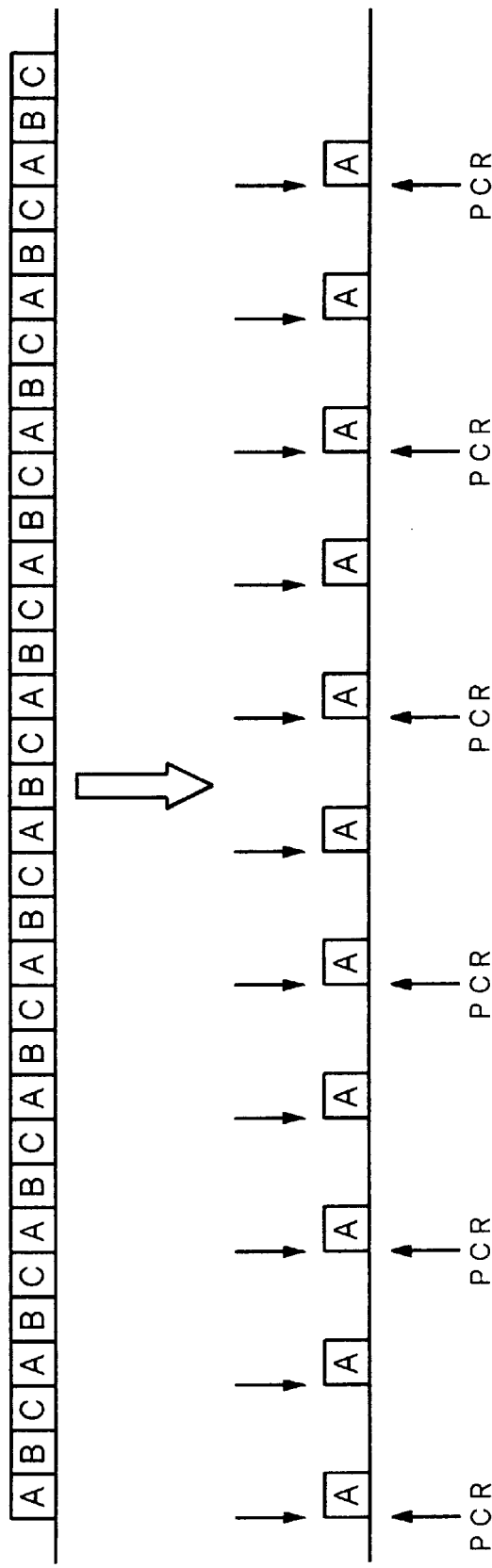
FIGS. 24A–B illustrate selecting one program from multiprograms.
Figure 27:
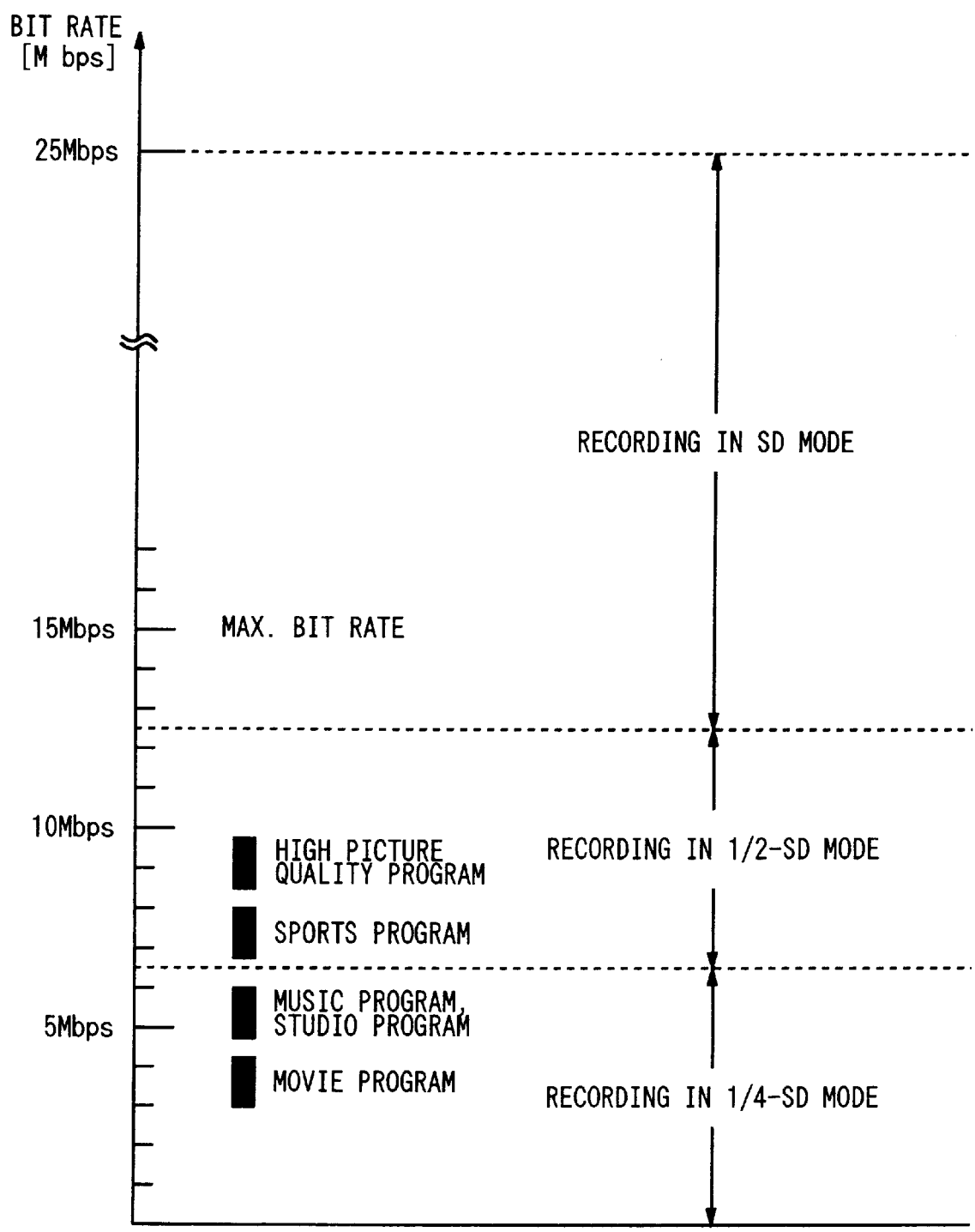
FIG. 27 illustrates the relationship between recording rates and recording times in the various recording modes.

FIG. 22 is a block diagram of a reproducing system, of the present invention. In FIG. 22, the recording signal of the magnetic tape is reproduced by rotary heads 60A, 60B, and 60B' and is supplied to a channel coder 62 through reproducing amplifiers 61A, 61B, and 61B', respectively. A head switching circuit (not shown) is provided between reproducing amplifiers 61A, 61B, and 61B' and channel coder 62 to select the reproduction signals from the appropriate rotary heads according to the operation mode. The channel coder demodulates the reproduction signal in a manner corresponding to the modulation performed by channel coder 6 of the recording system of FIG. 4.

An output of channel coder 62 is supplied to a Time Base Corrector (TBC) 63. The TBC is used to eliminate any time base fluctuation component of the reproduction signal. A clock based on the reproduction signal and a clock based on reference signal are supplied to the TBC.

An output of the TBC is supplied to a deframing circuit 64. The deframing circuit corresponds to frame forming circuit 5 of the recording system of FIG. 4, and performs an error correction process or the like. In the deframing circuit, the information indicative of the mode stored in the video AUX data is separated and the tape speed is set according to the mode and the heads to be used in reproduction are selected.

An output of deframing circuit 64 is supplied to a switching circuit 65. When the reproduction signal is the transport packet of the MPEG2 signal, the switching circuit is connected to terminal 65A. When the reproduction signal is a component signal, the switching circuit is connected to terminal 65B.

An output of terminal 65B of switching circuit 65 is supplied to a DCT expanding circuit 66 and is outputted by an output terminal 67. DCT expanding circuit 66 operates in a manner corresponding to DCT compressing circuit 3 of the recording system of FIG. 4. The DCT expanding circuit decodes the variable length code and performs an inverse DCT conversion, thereby generating the original input signal from the compressed video signal.

Terminal 65A of switching circuit 65 is connected to a packet processing circuit 68. The packet processing circuit includes a rate conversion buffer and converts the transport packet reproduced at a rate of, for example, 10 Mbps to its original rate of, for example, 30 Mbps. The packet processing circuit also detects the three bytes of time base information added to the header of the transport packet and determines the proper time base according to this time information and the reference clock. During reproduction the rotation of the drum is synchronized with the referenced clock as it was during recording. Therefore, the time base state before the recording can be perfectly reconstructed during reproduction.

During variable speed reproduction it is determined if the reproduced packet contains an I picture because only the packet including the I picture is outputted. An output of packet processing circuit 68 is outputted from an output terminal 70.

A controller 71 switches between ordinary reproduction and variable speed reproduction. A mode setting signal is supplied from an input unit 72 to the controller. A servo circuit 73 and packet processing circuit 68 are set according to the mode setting signal. A phase control and a speed control are performed by servo circuit 73 during variable speed reproduction using ATF control and data from the transport packet. Thus, trick play areas TP1 and TP2 are reproduced. The mode instruction information separated by deframing circuit 64 is supplied to controller 71, so that the tape speed during reproduction is set to the same speed as during recording by controller 71.

In the above example, although one program in the multiprograms of, for instance, 30 Mbps has been selected and recorded, when the overall rate of the multiprograms is equal to 25 Mbps, all of the multiprograms can be directly recorded by the digital VTR. Variable speed reproduction processes in this example are as follows.

Program A is selected and the I picture data is extracted therefrom and recorded to the trick play areas. Once the I-picture data of program A is recorded, program B is selected and the I picture data is recorded therefrom. Subsequently, program C is selected and recorded. In a manner similar to the above, the programs are processed like program A—program B—program C . . . program A—program B—program C.

One program can then be selected for reproduction, for example, program A. Then, only the data of program A is reproduced and dummy data is transmitted when data of another program is read.

The invention also functions for variable speed reproduction of a scrambled bit stream. One bit is stored in the header portion of the transport packet upon encoding to indicate whether the I picture is included in the packet. The packet headers are checked during reproduction to determine if the packet includes the I picture and if the data was scrambled. If the data, other than that stored in the header, has been scrambled the high frequency coefficients are required for reproduction and cannot be eliminated upon recording. Upon reproduction, data of the trick play areas are directly transmitted to be descrambled by the decoder and a high quality image is still generated via variable speed reproduction.

According to the invention, when the program is selected from the transport packet, is rate converted and is recorded, the tape speed is selected according to the bit rate of the selected program and the selected program is recorded without wasting recording tape space. Thus, azimuth recording in which the azimuths of adjacent tracks are different can be performed according to the present invention.

According to the present invention, when a program is selected from the transport packet, is rate converted and is recorded. The arrival time information of the transport packets based on the reference clock is added to a header of each packet. Thus, the same time base state as before recording is reconstructed during reproduction. Since the rotation of the drum is synchronized with the reference clock, the time information is available for recording or reproduction.

According to the invention, the two kinds of trick play areas TP1 and TP2 for high variable speed reproduction and low variable speed reproduction are provided and arranged at the tracks of different azimuths. The data of the I picture is recorded in trick play areas TP1 and TP2. The data in the trick play areas TP1 and TP2 is used during variable speed reproduction to improve the picture quality. Since the trick play areas TP1 and TP2 for high variable speed reproduction and low variable speed reproduction have been arranged in the tracks of different azimuth angles, respectively, the head construction of the apparatus is not limited.

Having described preferred embodiments of the invention, it is to be understood that the invention is not limited solely to those precise embodiments and that various changes and modifications could be effected therein by one skilled in the art without departing from the spirit or scope of the invention as defined in the appended claims.

I claim:

1. A recording apparatus for recording program data including a number of programs transmitted at variable bit rates to a recording medium, comprising:
    input means for receiving said program data;
    a clock circuit for generating a reference clock;
    a time information circuit for eliminating sync data in the received program data and for adding time information to the received program data in place of the eliminated sync data, said time information being based on the generated reference clock and representing time of arrival of said program data at said input means;
    extracting means for extracting a program from said program data;
    detecting means for detecting a bit rate of the extracted program;
    selecting means for selecting one of a number of data rates as a function of the detected bit rate of said program, said number of data rates including at least a standard recording rate and 1/N times the standard recording rate where N is a positive integer;
    driving means for driving said recording medium at a transport speed corresponding to the selected data rate; and
    control means for controlling said selecting means and said driving means such that a plurality of recording heads having different azimuths record said program to said recording medium on adjacent tracks, thereby suppressing crosstalk on said recording medium for said program.

2. A recording apparatus according to claim 1, wherein said data rates include ½ and ¼ of said standard recording rate.

3. A recording apparatus according to claim 1, wherein said recording medium is a magnetic type.

4. A recording apparatus according to claim 1, wherein said plurality of heads is comprised of two adjacent heads mounted in a double azimuth head assembly on a drum, said adjacent heads having different azimuth angles and a height difference therebetween of one track pitch.

5. A recording apparatus according to claim 4, wherein said control means controls said double azimuth head assembly to simultaneously record said program data on alternating scans of said recording medium, so that adjacent tracks of said program data have different azimuths.

6. A recording apparatus according to claim 1, wherein said plurality of heads is comprised of two adjacent heads having different azimuth angles and a third head positioned 180° from said adjacent heads on a drum, and being located at a same height to trace a same track during a scan of said recording medium.

7. A recording apparatus according to claim 6, wherein said control means controls said adjacent heads to record with one of said heads on alternating scans of said recording medium, so that adjacent tracks of said program data have different azimuths.

8. A recording apparatus according to claim 6, wherein said two adjacent heads record said program data during a non-standard mode at one of said plurality of data rates lower than said standard data rate; and said third head records said program data during a standard mode at said standard data rate.

9. A recording apparatus according to claim 1, wherein said program data is transmitted as a multiple of programs corresponding to different channels, each program transmitted at one of said variable bit rates.

10. A recording apparatus according to claim 1, wherein said selecting means selects the selected data rate by reducing the bit rate of said program data by an even fraction.

11. A recording apparatus according to claim 1, wherein said selecting means selects one of said plurality of data rates corresponding to trick play modes.

12. A recording apparatus according to claim 1, further comprising coding means for coding said program data according to MPEG standard before said program data is recorded to said recording medium.

13. A reproducing apparatus for reproducing program data containing time information in place of sync data that had been eliminated from said program data, said time information being based on a reference clock and representing time when said program data had been received, said program having been transmitted for recording at variable bit rates and having been recorded on a recording medium at a data rate selected from a number of data rates as a function of a bit rate detected from the variable bit rates of the transmitted program data, said number of data rates including at least a standard recording rate and 1/N times the standard recording rate where N is a positive integer, said program data being recorded in adjacent tracks of different azimuths, said reproducing apparatus comprising:

means for driving said recording medium at a transport speed corresponding to the selected data rate used to record said program data; and control means for controlling said means for driving such that said program data is reproduced at said variable bit rates from said adjacent tracks of different azimuths on said recording medium, thereby suppressing crosstalk during reproduction for said program data.

14. A reproducing apparatus according to claim 13, wherein said recording medium is a magnetic tape.

15. A reproducing apparatus according to claim 13, wherein when the selected data rate is 1/N times said standard recording rate, said transport speed is 1/N times a standard transport speed corresponding to said standard recording rate.

16. A reproducing apparatus according to claim 15, wherein when N=2, said transport speed is about 4.25 to 4.5 times said standard transport speed.

17. A reproducing apparatus according to claim 15, wherein when N=4, said transport speed is about 2.25 to 2.5 times said standard transport speed.

18. A reproducing apparatus according to claim 15, wherein said standard transport speed is selectively used in a normal-play mode or a trick-play mode of said recording medium to which said program data had been recorded at said standard recording rate.

19. A recording and reproducing apparatus for recording and reproducing program data including a number of programs transmitted at variable bit rates to/from a recording medium, comprising:

input means for receiving said program data;

a clock circuit for generating a reference clock;

a time information circuit for eliminating sync data in the received program data and for adding time information to the received program data in place of the eliminated sync data, said time information being based on the generated reference clock and representing time of arrival of said program data at said input means;

extracting means for extracting a program from said program data;

detecting means for detecting a bit rate of the extracted program;

selecting means for selecting one of a number of data rates as a function of the detected bit rate of said program, said number of data rates including at least a standard recording rate and 1/N times the standard recording rate where N is a positive integer;

driving means for driving said recording medium at a transport speed corresponding to the selected data rate;

control means for controlling said selecting means and said driving means such that a plurality of heads record said program to said recording medium on adjacent tracks with different azimuths, thereby suppressing crosstalk on said recording medium;

means for obtaining the selected data rate for reproduction of said program from said recording medium; and means for reproducing said program from said recording medium.

20. A recording and reproducing apparatus according to claim 19, wherein when the selected data rate is 1/N times said standard recording rate, said transport speed is 1/N times a standard transport speed corresponding to said standard recording rate.

21. A recording and reproducing apparatus according to claim 20, wherein when N=2, said transport speed is about 4.25 to 4.5 times said standard transport speed.

22. A recording and reproducing apparatus according to claim 20, wherein when N=4, said transport speed is about 2.25 to 2.5 times said standard transport speed.

23. A recording and reproducing apparatus according to claim 20, wherein said standard transport speed is selectively used in a normal-play mode or a trick-play mode of said recording medium to which said program data had been recorded at said standard recording rate.

* * * * *